(12) United States Patent
Lyu et al.

(10) Patent No.: US 7,929,088 B2
(45) Date of Patent: Apr. 19, 2011

(54) LIQUID CRYSTAL DISPLAYS

(75) Inventors: Jae-Jin Lyu, Kyungki-do (KR); Hea-Ri Lee, Seoul (KR); Kyeong-Hyeon Kim, Kyungki-do (KR); Jian-Min Chen, Kyungki-do (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 384 days.

(21) Appl. No.: 11/204,041

(22) Filed: Aug. 16, 2005

(65) Prior Publication Data

US 2005/0280760 A1    Dec. 22, 2005

Related U.S. Application Data

(62) Division of application No. 10/655,516, filed on Sep. 4, 2003, now Pat. No. 6,943,858, which is a division of application No. 10/114,718, filed on Apr. 1, 2002, now Pat. No. 6,646,701, which is a division of application No. 09/087,628, filed on May 29, 1998, now abandoned.

(30) Foreign Application Priority Data

May 29, 1997    (KR) ..................... 97-21709
Jun. 27, 1997    (KR) ..................... 97-28480

(51) Int. Cl.
*G02F 1/1335*    (2006.01)

(52) U.S. Cl. ........................................ 349/119; 349/108

(58) Field of Classification Search .......... 349/117–119, 349/106–108
See application file for complete search history.

(56) References Cited

U.S. PATENT DOCUMENTS 4,054,368 A    10/1977    Krueger et al. ............... 349/117

(Continued)

FOREIGN PATENT DOCUMENTS

JP    58116518 A    7/1983

(Continued)

OTHER PUBLICATIONS

T. Hashimoto and T. Saitoh, TN-LCD with Quartered Subpixels Using Polarized UV-Light Irradiated Polymer Orientation Films, SID 95 Digest, pp. 877-880.

*Primary Examiner* — Dung T. Nguyen
(74) *Attorney, Agent, or Firm* — F. Chau & Associates, LLC

(57) ABSTRACT

A liquid crystal display comprises two parallel spaced substrates and a liquid crystal layer with negative dielectric anisotropy interposed between the substrates. The ratio d/p, the cell gap d between the substrates to the pitch p of the liquid crystal layer, is equal to or less than 0.3, and the retardation value $\Delta n*d$ may be in the range of 0.25-0.4. In absence of electric field, the liquid crystal molecules are arranged vertically to the substrates, and when the sufficient electric field is applied, the liquid crystal molecules are parallel to the substrates and twisted by 90° from one substrate to the other.

To the outer surface of a liquid crystal cell having a liquid crystal material with a negative dielectric anisotropy, a combination of a-plate, c-plate or biaxial compensation films is attached. The direction having the largest refractive index of the a-plate or the biaxial film is parallel or perpendicular to the polarizing direction of adjacent polarizer. The difference between the summation of the retardation $(n_x-n_z)*d$ of the a-plate, the c-plate and the biaxial films and the polarizers, and the retardation due to birefringence of the liquid crystal cell is equal to or less than 15% of the retardation due to birefringence of the liquid crystal cell. The retardation $(n_x-n_y)*d$ of the a-plate or the biaxial film is 0-100 nm. $n_x$, $n_y$ and $n_z$ are the refractive indices of the x, y and z axes respectively when the z axis is perpendicular to the surface of the liquid crystal cell, the x axis is in the surface of the liquid crystal cell and having the largest refractive index of the a-plate or the biaxial film and the y axis is in same plane as the x axis and perpendicular to the x axis, and d is the thickness of the film.

10 Claims, 27 Drawing Sheets

U.S. PATENT DOCUMENTS

| | | | |
|---|---|---|---|
| 4,068,925 A | 1/1978 | Tani et al. | 349/130 |
| 4,490,015 A | 12/1984 | Kawarada et al. | 349/178 |
| 5,039,185 A | 8/1991 | Uchida et al. | 349/178 |
| 5,237,438 A | 8/1993 | Miyashita et al. | |
| 5,298,199 A | 3/1994 | Hirose et al. | 349/117 |
| 5,477,358 A | 12/1995 | Rosenblatt et al. | 349/130 |
| 5,504,603 A | 4/1996 | Winker et al. | 349/117 |
| 5,519,523 A | 5/1996 | Madokoro et al. | 349/117 |
| 5,548,426 A | 8/1996 | Miyashita et al. | |
| 5,550,661 A | 8/1996 | Clark et al. | 349/117 |
| 5,557,434 A | 9/1996 | Winker et al. | 349/117 |
| 5,570,214 A | 10/1996 | Abileah et al. | 349/117 |
| 5,598,285 A | 1/1997 | Kondo et al. | 349/39 |
| 5,696,570 A | 12/1997 | Plach et al. | |
| 5,757,455 A | 5/1998 | Sugiyama et al. | 349/129 |
| 5,770,826 A | 6/1998 | Chaudhari et al. | 201/157.15 |
| 6,081,311 A * | 6/2000 | Murai | 349/118 |
| 6,141,075 A * | 10/2000 | Ohmuro et al. | 349/130 |
| 6,166,798 A | 12/2000 | Plach et al. | |
| 6,646,701 B2 | 11/2003 | Lyu et al. | 349/119 |
| 7,057,689 B2 | 6/2006 | Terashita et al. | |
| 7,636,136 B2 | 12/2009 | Zhang et al. | |
| 2002/0149733 A1 | 10/2002 | Lyu et al. | 349/155 |
| 2005/0248704 A1* | 11/2005 | Ohmuro et al. | 349/117 |

FOREIGN PATENT DOCUMENTS

| | | |
|---|---|---|
| JP | 2-19833 | 11/1990 |
| JP | 05-019251 | 1/1993 |
| JP | 06-003663 | 1/1994 |
| WO | 93/21281 | 10/1993 |

* cited by examiner d/p=0.1 d/p=0.3 d/p=0.5 d/p=0.3 d/p=0.3 d/p=0.5

FIG.11C
FIG.11D
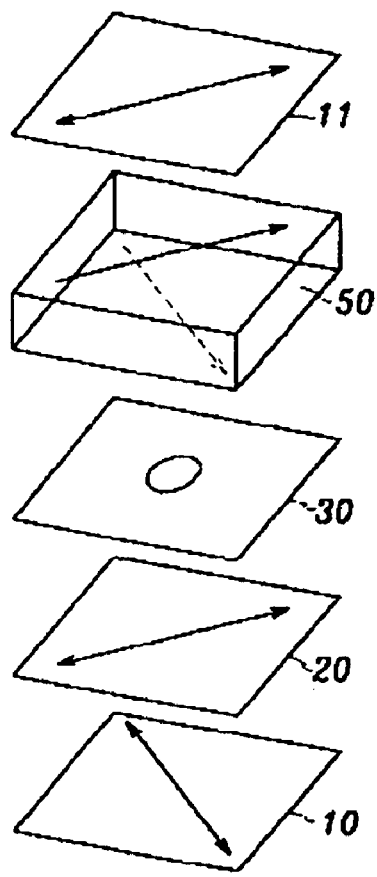
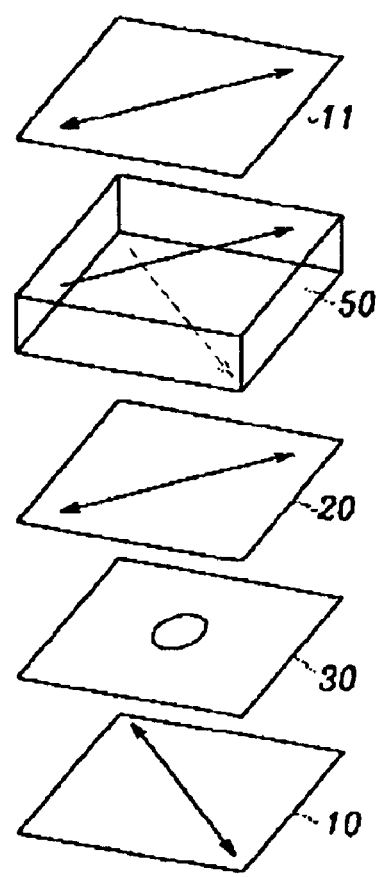

LIQUID CRYSTAL DISPLAYS

CROSS REFERENCE TO PRIOR APPLICATIONS

This application is a Divisional Application of a co-pending U.S. patent application Ser. No. 10/655,516 filed on Sep. 4, 2003, now U.S. Pat. No. 6,943,858, which is a Divisional Application of Application Ser. No. 10/114,718 filed on Apr. 1, 2002, issued as U.S. Pat. No. 6,646,701 on Nov. 11, 2003, which is a Divisional Application of Application Ser. No. 09/087,628, filed on May 29, 1998, now abandoned, which claims priority to and the benefit of Korean Patent Application No. 1997-21709, filed on May 29, 1997 and Korean Patent Application No. 1997-28480, filed on Jun. 27, 1997, which are all hereby incorporated by reference for all purposes as if fully set forth herein.

BACKGROUND OF THE INVENTION (a) Field of the Invention

The present invention relates to liquid crystal displays using vertical alignment and compensation films.

(b) Description of the Related Art

A liquid crystal display has two substrates opposite each other and a liquid crystal layer interposed between the substrates. If the electric field is applied to the liquid crystal layer, the liquid crystal molecules changes their orientations to control the transmittance of the incident light.

A twisted nematic (TN) liquid crystal display includes a couple of transparent substrates having transparent electrodes thereon, a liquid crystal layer interposed between the substrates, and a couple of polarizers which are attached to the outer surfaces of the substrates. In off state, i.e., in absence of the electric field, the molecular axes of the liquid crystal molecules are aligned parallel to the substrates and twisted spirally by a constant pitch from one substrate to the other substrate, and the director of the liquid crystal layer varies continuously.

However, the contrast ratio of the conventional TN mode liquid crystal display, especially in normally black mode, may not be so high because the incident light is not fully blocked in absence of the electric field.

To solve this problem, a vertically aligned twisted nematic (VATN) mode liquid crystal display is proposed in the U.S. Pat. No. 5,477,358, "CHIRAL NEMATIC LIQUID CRYSTAL DISPLAY WITH HOMEOTROPIC ALIGNMENT AND NEGATIVE DIELECTRIC ANISOTROPY", whose patentee is Case Western Reserve University and in "Eurodisplay '93", pp. 158-159 by Takahashi et al.

On the contrary to the TN mode, the alignment of the liquid crystal molecules of the VATN mode liquid crystal display in off state is similar to that of the TN mode in on state, that is, the liquid crystal molecules align perpendicular to the substrates. In the on state, the molecular axes of the liquid crystal molecules are aligned parallel to the substrates and twisted spirally by a constant pitch from one substrate to the other substrate, and the director of the liquid crystal layer varies continuously.

In case of VATN mode liquid crystal display in normally black mode, sufficient darkness in off state because the molecular axes of the liquid crystal molecules are aligned vertically to the substrate when the electric field is applied.

The display characteristics of VATN may become better by optimizing the parameters such as the ratio d/p of the cell gap d to the pitch p of the liquid crystal layer, the difference of refractive indices $\Delta n$ between in both directions and the retardation value $\Delta n * d$.

In the mean time, because of the refractive anisotropy of the liquid crystal material, the retardation value $\Delta n * d$ changes as the viewing direction, thereby causing the difference of the intensity and the characteristics of light. Therefore, TN displays have the change in contrast ratio, color shift, gray inversion, etc. according to the viewing angle.

TN LCDs with compensation film are developed to compensate the difference of retardation in liquid crystal layer. However, the film compensated TN LCDs still have problems such as inharmony of the display characteristics and gray inversion.

SUMMARY OF THE INVENTION

It is therefore an object of the present invention to provide optimized cell parameters such as d/p, $\Delta n$ and $\Delta n * d$ to improve the optical characteristics fo LCDs.

It is another object of the present invention to widen the viewing angle of liquid crystal displays.

It is another object of the present invention to increase the contrast ratio of liquid crystal displays.

These and other objects, features and advantages are provided, according to the present invention, by a liquid crystal display comprising two parallel spaced substrates and a liquid crystal layer with negative dielectric anisotropy injected between two substrates wherein the ratio d/p, the cell gap d between two substrates to the pitch p of the liquid crystal layer, may be equal to or less than 0.3.

The liquid crystal layer is made of a chiral nematic liquid crystal or a nematic liquid crystal with 0.01-1.0 wt % of chiral dopant.

On two substrates, alignment layers are formed to align the liquid crystal molecules vertically to the substrates. The alignment layers may or may not be rubbed.

The refractive anisotropy $\Delta n$ may be 0/065-0.123, the cell gap d between two substrates may be 3.0-6.0 μm and the retardation value $\Delta n * d$ may be 0.25-0.4.

When the electric field is not applied, the liquid crystal molecules are arranged vertically to the substrates, and when the sufficient electric field is applied, the liquid crystal molecules are parallel to the substrates and twisted by 90° from one substrate to the other.

These and other objects, features and advantages are also provided, according to the present invention, by a liquid crystal display comprising a liquid crystal cell having a liquid crystal material with a negative dielectric anisotropy, and a combination of a-plate, c-plate or biaxial compensation films attached to the outer surface of the liquid crystal cell.

The slow axis which is the direction having the largest refractive index of a-plate or biaxial compensation film may be parallel or perpendicular to the transmission axis of adjacent polarizer.

The difference between the summation of the retardation $(n_{xa}-n_{za})*d_a$ of the a-plate compensation film, the retardation $(n_{xc}-n_{zc})*d_c$ of the c-plate compensation film, the retardation $(n_{xb}-n_{zb})*d_b$ of the biaxial compensation film and the retardation of the polarizers, and the retardation of the liquid crystal cell may be equal to or less than 15% of the retardation of the liquid crystal cell. The retardation $(n_{xa}-n_{ya})*d_a$ of the a-plate compensation film or the retardation $(n_{xb}-n_{yb})*d_b$ of the biaxial compensation film may be 0-100 nm. Here, $n_x$, $n_y$, and $n_z$ are the refractive indices of the x, y and z axes respectively when z axis is the direction perpendicular to the surface of the liquid crystal cell, x axis is in the surface of the liquid crystal cell and having the largest refractive index of the a-plate or the biaxial compensation film and y axis is in the surface of the liquid crystal cell and perpendicular to the x axis, and d is the thickness of the liquid crystal cell.

DETAILED DESCRIPTION OF THE PREFERRED EMBODIMENTS

Figure 1A:
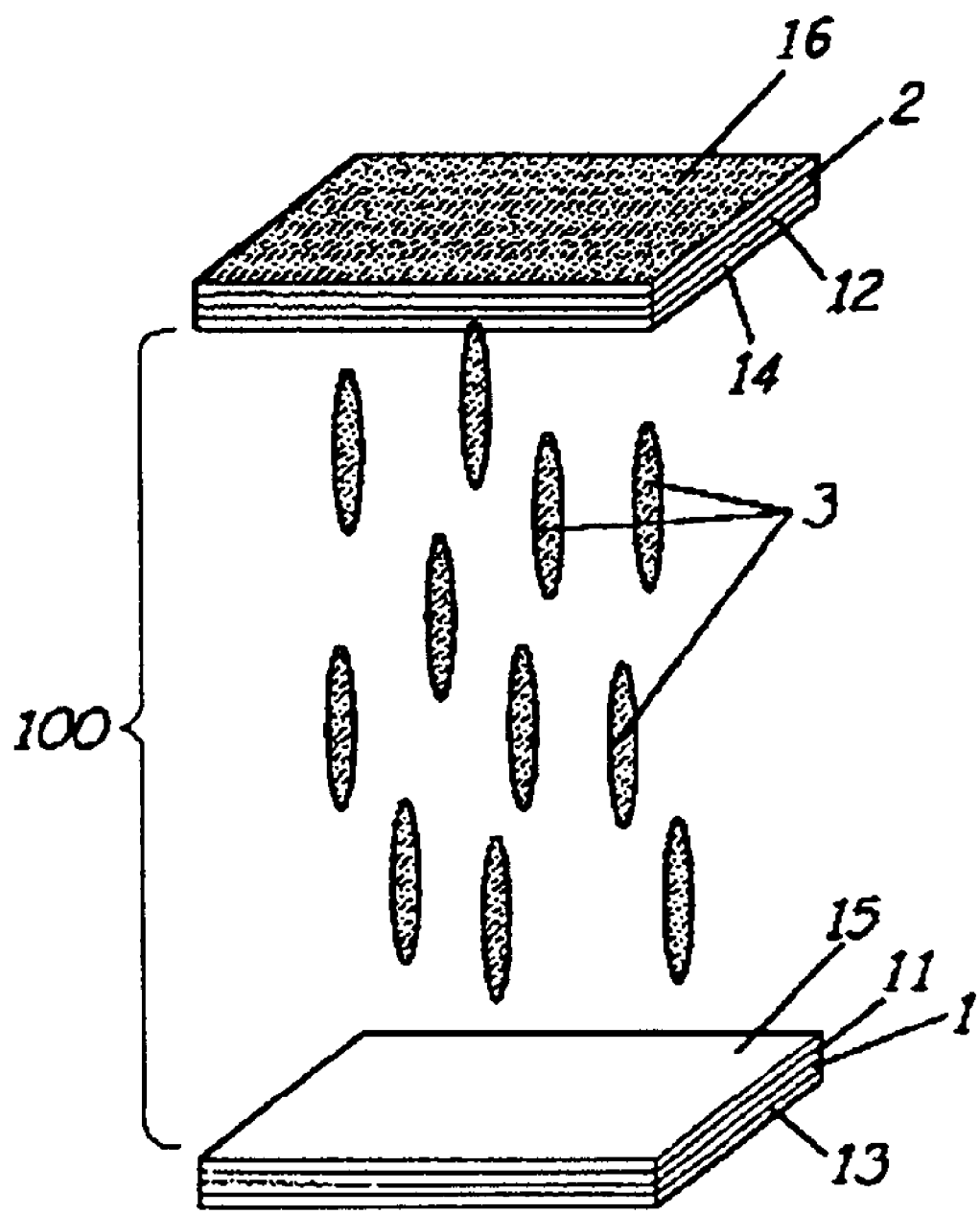
FIGS. 1A and 1B are schematic diagrams of the alignment of liquid crystal molecules of a VATN liquid crystal display respectively in black state and white state according to an embodiment of the present invention.

The present invention will now be described more fully hereinafter with reference to the accompanying drawings, in which preferred embodiments of the present invention are shown. This invention may, however, be embodied in different forms and should not be construed as limited to the embodiments set forth herein. Rather, these embodiments are provided so that this disclosure will be thorough and complete, and will fully convey the scope of the invention to those skilled in the art. In the drawings, the thickness of layers and regions are exaggerated for clarity.

Figure 1B:
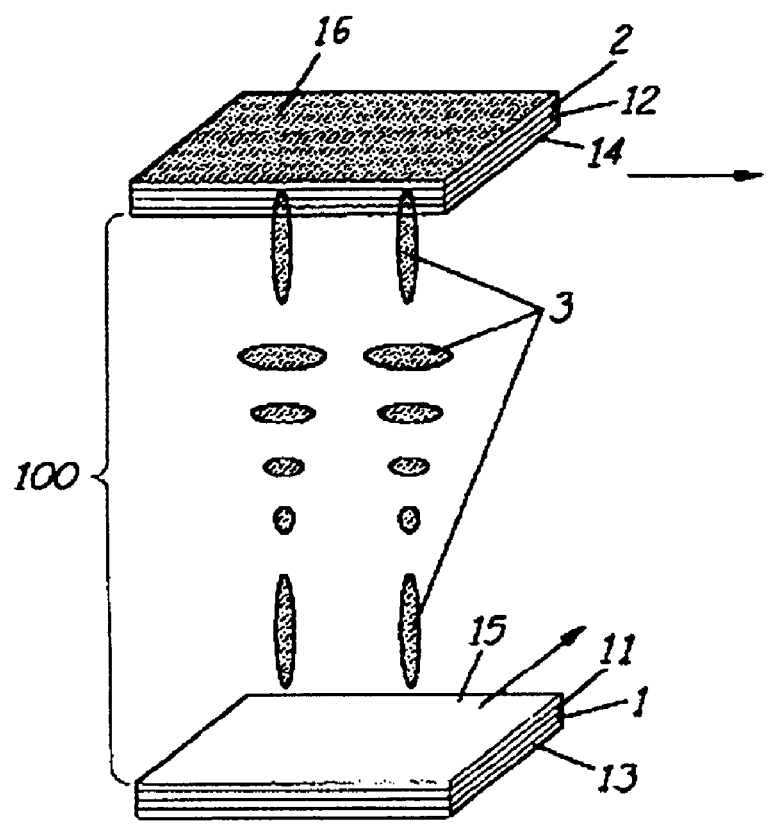
Figure 2:
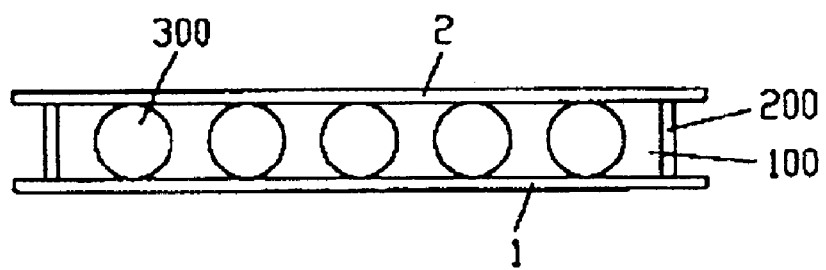
FIG. 2 is a sectional view of a VATN liquid crystal cell according to the present invention.

FIGS. 1A and 1B are schematic diagrams of the alignment of liquid crystal molecules of a VATN liquid crystal display respectively in black state and white state according to an embodiment of the present invention. FIG. 2 shows the structure of a VATN liquid crystal display according to an embodiment of the present invention.

As shown in FIGS. 1A and 1B, two transparent insulating substrates 1 and 2 are opposite and spaced apart from each other, and transparent electrodes 12 and 120 made of a transparent conductive material such as ITO (indium tin oxide). Alignment layers 14 and 140 are formed on the inner surfaces of the substrates 1 and 2. Between two substrates 1 and 2, a liquid crystal material layer 100 made of a chiral nematic liquid crystal having negative dielectric anisotropy or a nematic liquid crystal material doped with chiral dopant of 0.01-0.3 wt % is interposed. The ratio d/p, the cell gap d between the substrates 1 and 2 divided by the pitch p of the liquid crystal layer 100, is preferably equal to or less than 0.3, and the retardation value $\Delta n*d$ is preferably in the range of 0.25-0.4. On the outer surfaces of two substrates 1 and 2, a polarizer 13 and an analyzer 130, which polarize the rays incident on the liquid crystal material layer 100 and the rays out of the liquid crystal material layer 100 respectively, are attached. The polarizing direction of the polarizer 13 attached to the lower substrate 1 is perpendicular to that of the analyzer 130 attached to the upper substrate 2. Alignment layers 14 and 15 may be rubbed or not.

FIG. 1A shows the off state that the electric field is not applied, where the molecular axes of the liquid crystal molecules 3 in the liquid crystal layer 100 are aligned perpendicular to the surface of the substrates 1 and 2 by the aligning force of the alignment layers 14 and 15.

The polarized light by the polarizer, 13 passes through the liquid crystal layer 100 without changing its polarization. Then, the light is blocked by the analyzer 130 to make a black state.

FIG. 1B shows the on state that the sufficient electric field is applied to the liquid crystal layer by the electrodes 4 and 5, where the liquid crystal molecules 3 in the liquid crystal layer 100 are twisted spirally by 90° from the lower substrate 1 to the upper substrate 2 and the director of the liquid crystal layer varies continuously. Near the inner surfaces of two substrates 1 and 2, the aligning force of the alignment layers 14 and 15 is larger than the force due to the applied electric field, and thus the liquid crystal molecules stay vertically aligned.

The polarized light by the polarizer 13 passes through the liquid crystal layer 100, and its polarization is rotated by 90° according to the variation of the director of the liquid crystal layer. Accordingly the light passes through the analyzer 130 to make a white state.

Next, the experiments according to the present invention will be described.

FIG. 2 is a sectional view of a VATN liquid crystal cell according to the present invention.

As shown in FIG. 2, a liquid crystal layer 100 is interposed between two parallel substrates 1 and 2 spaced apart from each other. Spacers 200 are mixed with the liquid crystal layer 100 to sustain the gap between the substrates 1 and 2. On the inner surfaces of the substrates 1 and 2 near the edge of the substrates 1 and 2, a sealant 300 is formed to prevent the liquid crystal material from flowing out of the cell.

Experiment 1

In this experiment JALS204, JALS572 (Japan Synthetic Rubber Co.) or SE-1211 (Nissan Chemical Co.) which are used for homeotropic alignment layers were used as an alignment layer. Plastic spacers having 4.5 μm diameter were included in the sealant 300, and the diameter of spacers spread on the substrate 1 or 2 to maintain the cell gap was 4.5 μm. Liquid crystal material, which is filled in the gap between the substrates, was a twisted nematic liquid crystal material with negative dielectric anisotropy and doped with a dopant MLC 6247 (Merck Co.). The refractive anisotropy Δn of the liquid crystal was 0.085, the dielectric anisotropy Δε was 4.5, the elastic constant $K_{11}$ was 15.4 pN, $K_{22}$ was 5.8 pN and $K_{33}$ was 17.4 pN, and the viscosity was 30 mm$^2$/s. The cell gap d varies from 3 μm to 6 μm, and the pitch p is adjusted by varying the amount of the added dopant.

Figure 3:
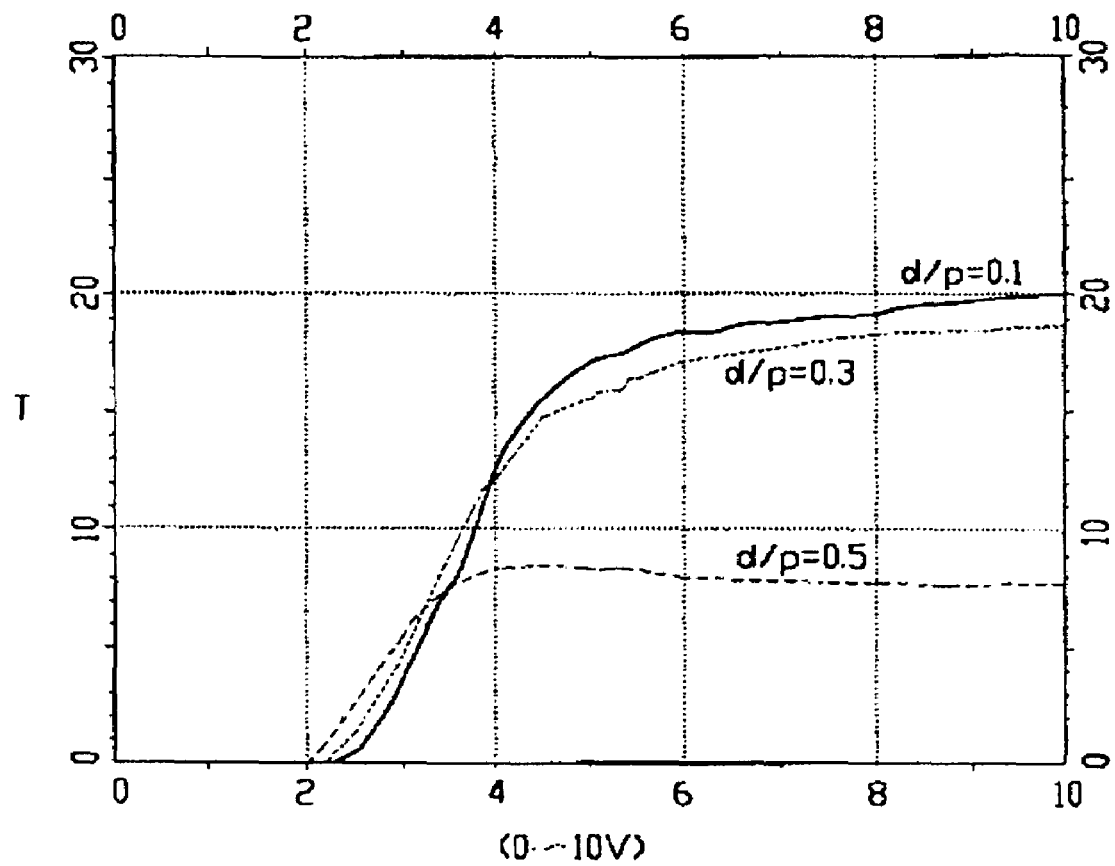
FIG. 3 is a graph showing transmittance T as a function of voltage V applied to the liquid crystal cell for various d/p in the Experiment 1.
Figure 4A:
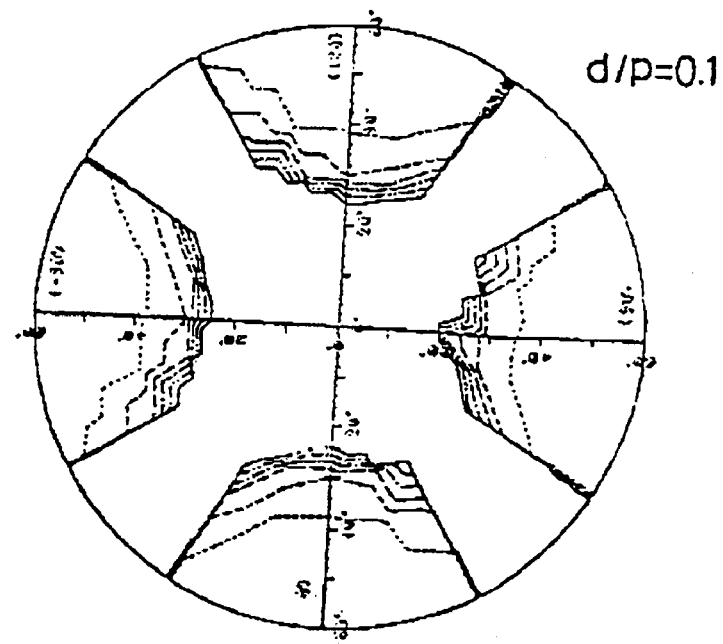
FIGS. 4A, 4B and 4C show the viewing angle characteristics for various d/p in the Experiment 1.
Figure 4B:
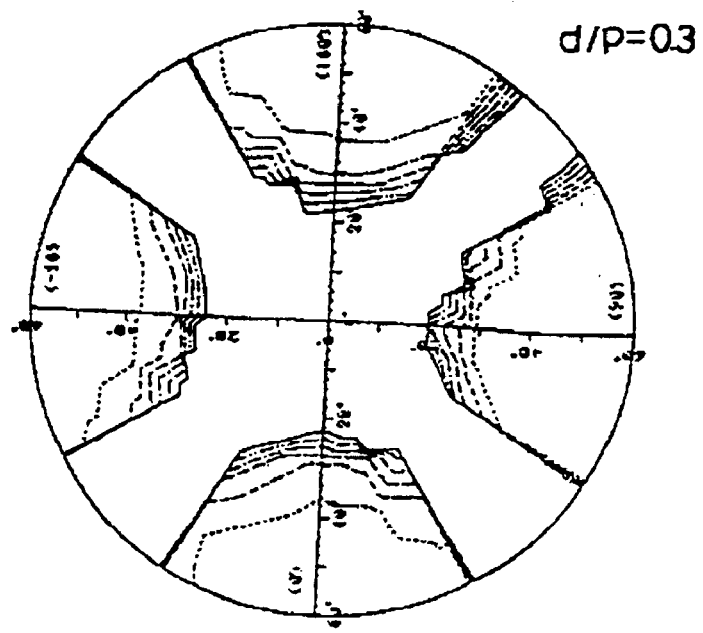
Figure 4C:
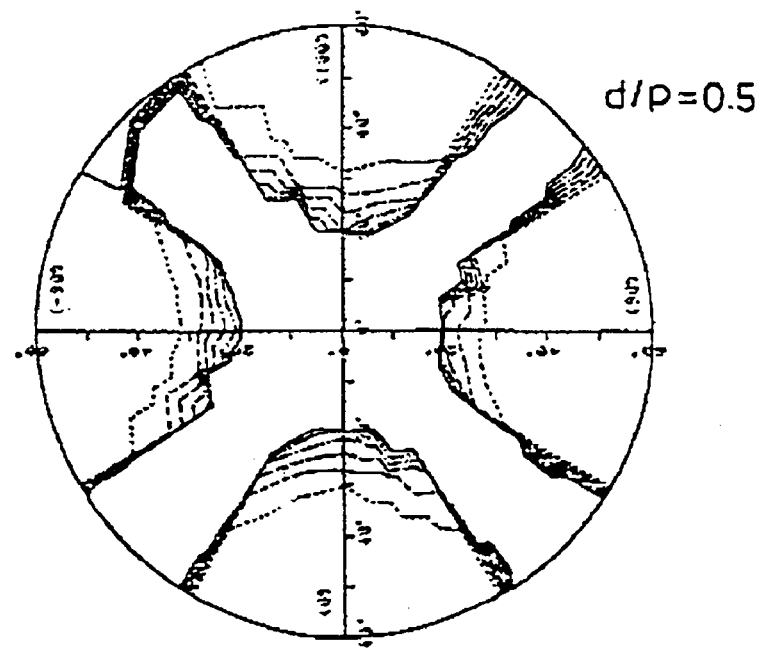

FIG. 3 is a graph showing transmittance T as a function of voltage V applied to the liquid crystal cell for various d/p, and FIGS. 4A, 4B and 4C show the viewing angle characteristics for various d/p in the Experiment 1.

As shown in FIG. 3, the transmittance T increases as d/p decreases. When d/p is 0.5, the transmittance is less than 10%. However, if d/p is 0.1 or 0.3, the transmittance has relatively high value more than 18%. The voltage difference between the electrodes is in the range of 0-10 V.

As a result, the transmittance T increases as d/p decreases, and the transmittance is high when the d/p is less than 0.3.

When d/p is 0.5, the viewing angles in up, down, left and right directions are about 40° and those in diagonal directions are less than 90° partly as shown in FIG. 4C. However, as shown in FIGS. 4A and 4B, when d/p is 0.1 or 0.3, the viewing angles in up, down, left and right directions are larger than 40° and those in diagonal directions are more than 90°.

Experiment 2

In this experiment, the structure of liquid crystal cell was the same as in the first experiment except the alignment layers. In Experiment 2, an alignment layer 14 was rubbed in the direction of 45° polar angle. As a result of the rubbing, the liquid crystal molecules were tilted by about 1° with respect to the perpendicular direction to the substrate.

Figure 6A:
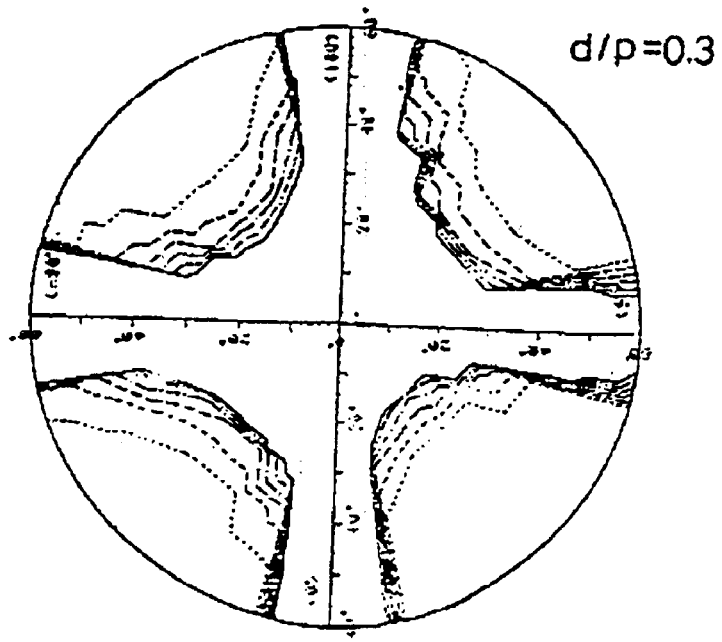
FIGS. 6A and 6B show the viewing angle characteristics for various d/p in the Experiment 2.
Figure 5:
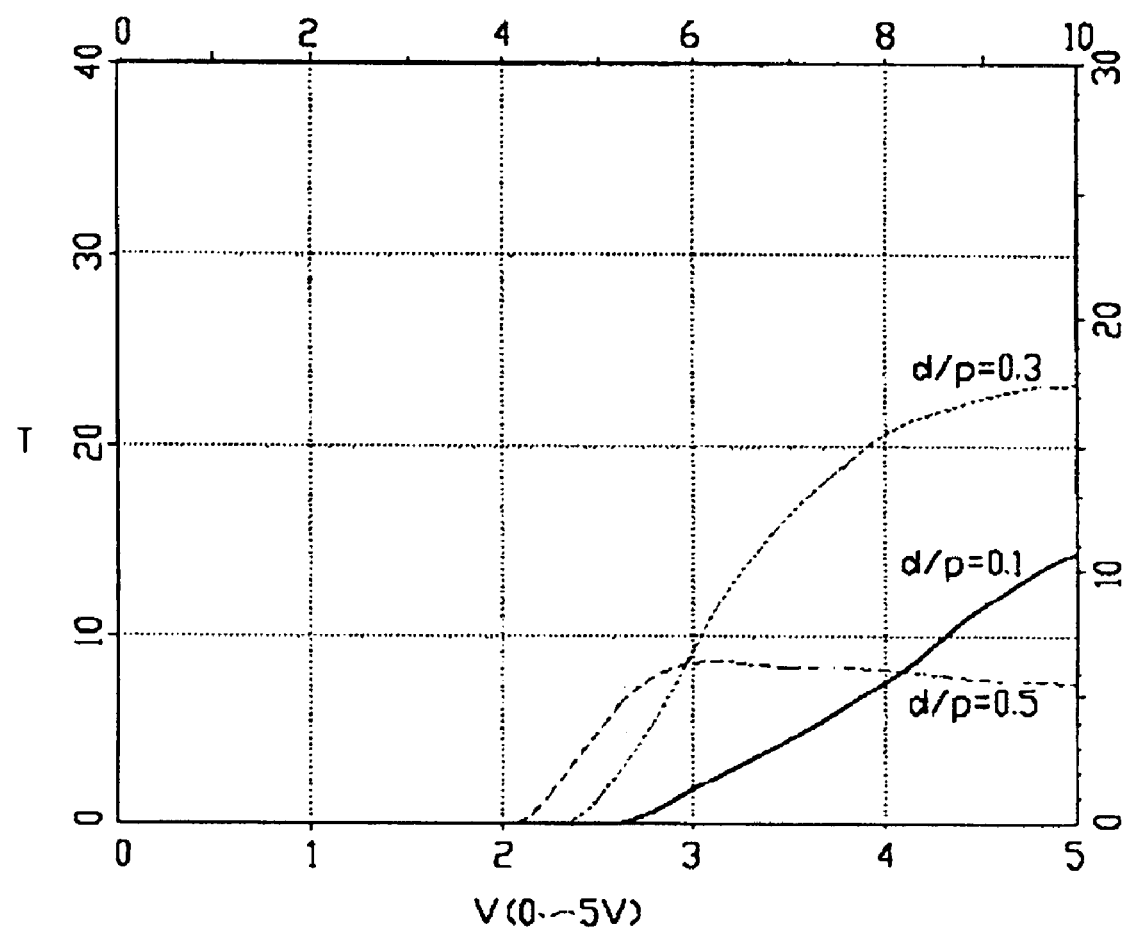
FIG. 5 is a graph showing transmittance T as a function of voltage V applied to the liquid crystal cell for various d/p in the Experiment 2.
Figure 6B:
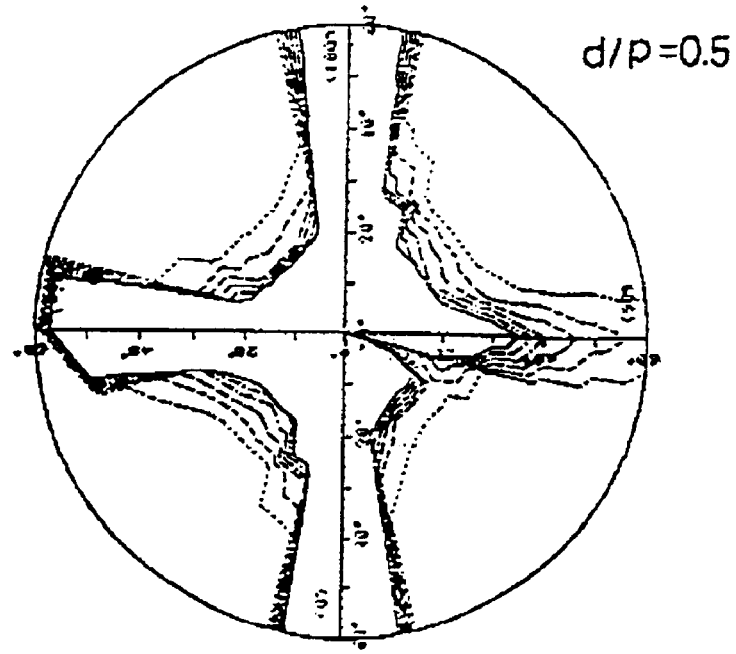

FIG. 5 is a graph showing transmittance T as a function of voltage V applied to the liquid crystal chill for various d/p, and FIGS. 6A and 6B show the viewing angle characteristics for various d/p in the Experiment 2.

As shown in FIG. 5, when d/p is 0.5, the transmittance is less than 10% for the sufficient applied voltage. However, when d/p is 0.1, the transmittance increases to more than 10% as the voltage increases, and when d/p is 0.3, the transmittance is over 20%. The voltage difference between the electrodes is in the range of 0-5 V.

FIGS. 6A and 6B show the viewing angle characteristics. When d/p is 0.5, as shown in FIG. 6B, the viewing angles in up and down directions are more than 90° but those in left and right directions are less than 90°. However, as shown in FIG. 6A, in the case that d/p is 0.3, all the viewing angles in up, down, left and right directions are over 90°.

Experiment 3

In this experiment, the structure of the liquid crystal cell was the same as in the first experiment except the alignment layers. In Experiment 3, two alignment layers 14 and 15 were rubbed in the direction of 0° polar angle and 90° polar angle respectively, therefore the rubbing directions of two alignment layers 14 and 15 are perpendicular to each other.

Figure 8A:
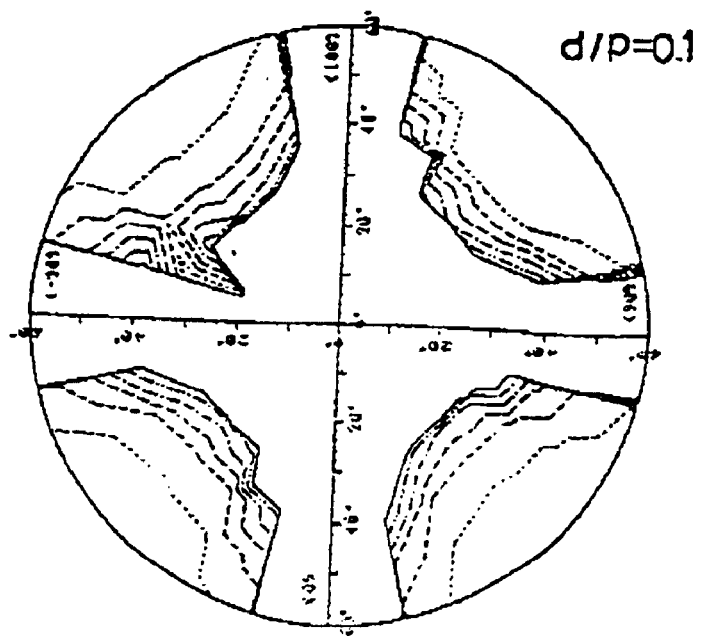
FIGS. 8A, 8B and 8C show the viewing angle characteristics for various d/p in the Experiment 3.
Figure 7:
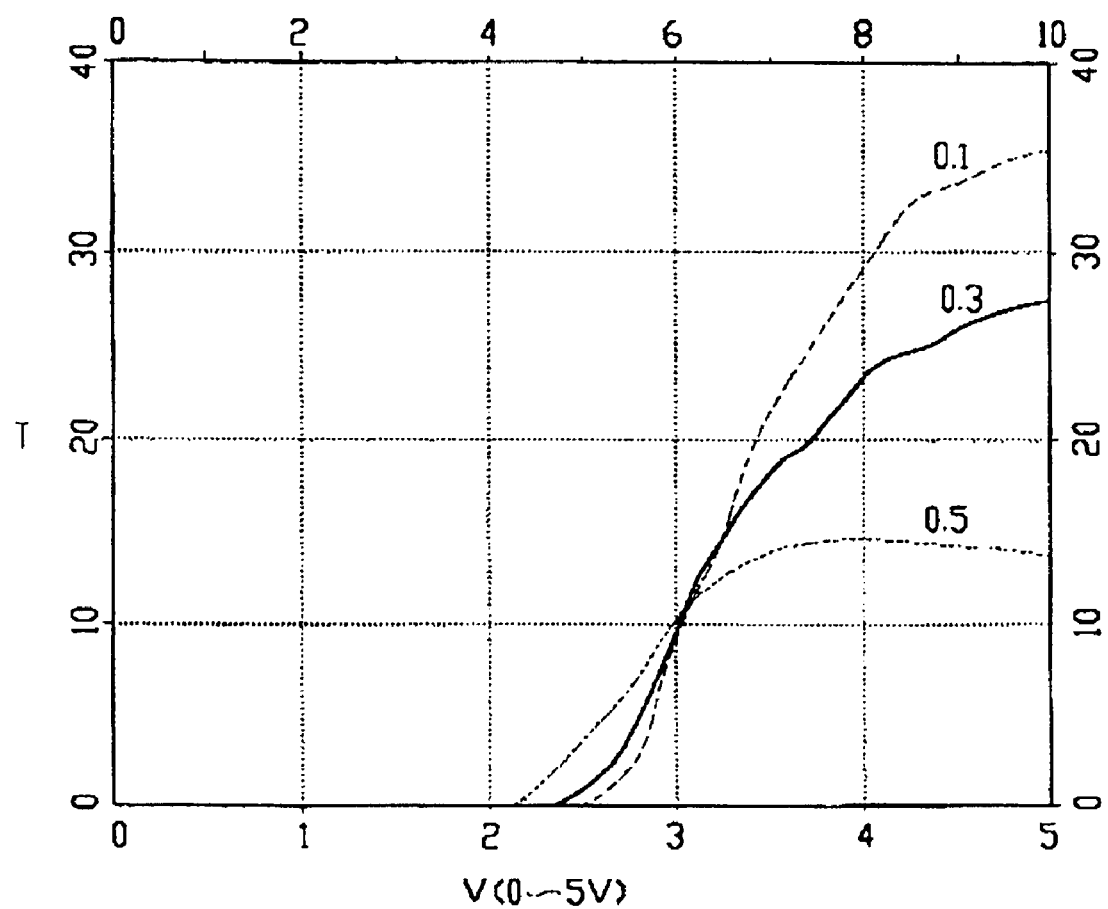
FIG. 7 is a graph showing transmittance T as a function of voltage V applied to the liquid crystal cell for various d/p in the Experiment 3.
Figure 8B:
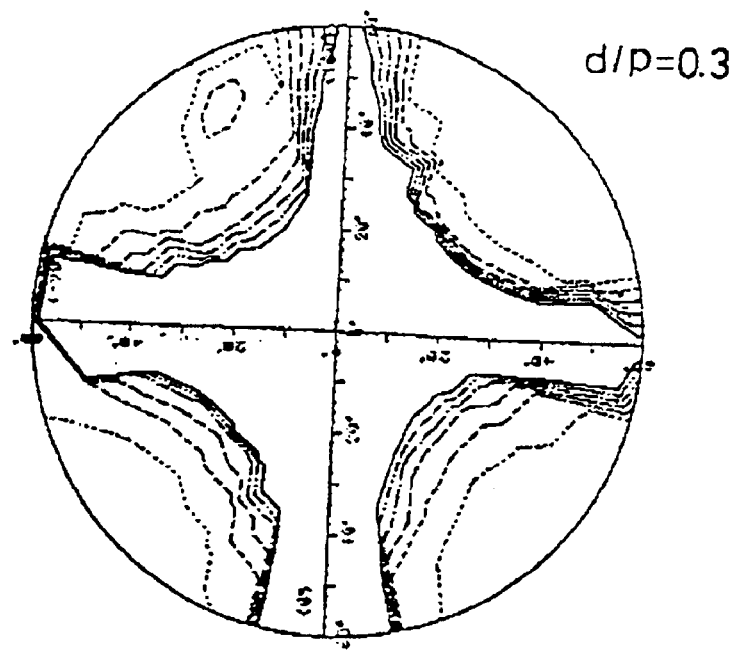
Figure 8C:
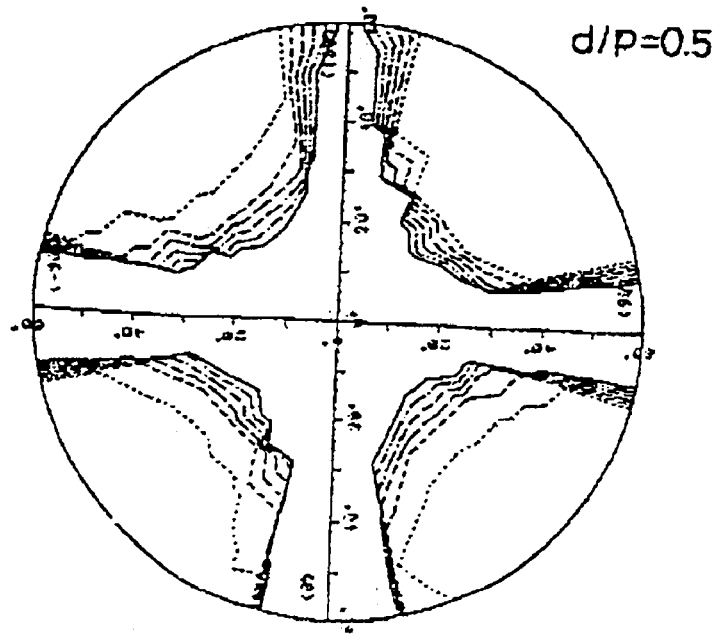

FIG. 7 is a graph showing transmittance T as a function of voltage V applied to the liquid crystal tell for various d/p, and FIGS. 8A, 8B and 8C show the viewing angle characteristics for various d/p in the Experiment 3.

As shown in FIGS. 7 and 8A-8C, the transmittance T decreases as d/p increases, and thus the contrast ratio decreases and the viewing angle characteristics become worse.

As shown in FIG. 7, when d/p is 0.5, the transmittance is less than 10% for the sufficient applied voltage. However, when d/p is 0.3, the transmittance increases to more than 25% as the voltage increases, and when d/p is 0.1, the transmittance is over 35%. The voltage difference between the electrodes is in the range of 0-5 V.

As shown in FIGS. 8A and 8C, when d/p is 0.1 or 0.5, the viewing angles in up, down, left and right directions are larger than 90°. However, as shown in FIG. 8B, when d/p is 0.3, the viewing angles in up, down, left and right directions are about 90°.

Experiment 4

In this experiment, the dependency of the viewing angle characteristics in diagonal directions on the retardation value Δnd was tested. As in Experiment 3, all the alignment layers 14 and 15 were rubbed. Δn varies in the range of 0.065-0.123 and the cell gap d varies in the range of 3.0-5.0 μm to vary the retardation value Δnd in the range of 0.3-0.6.

Figure 9:
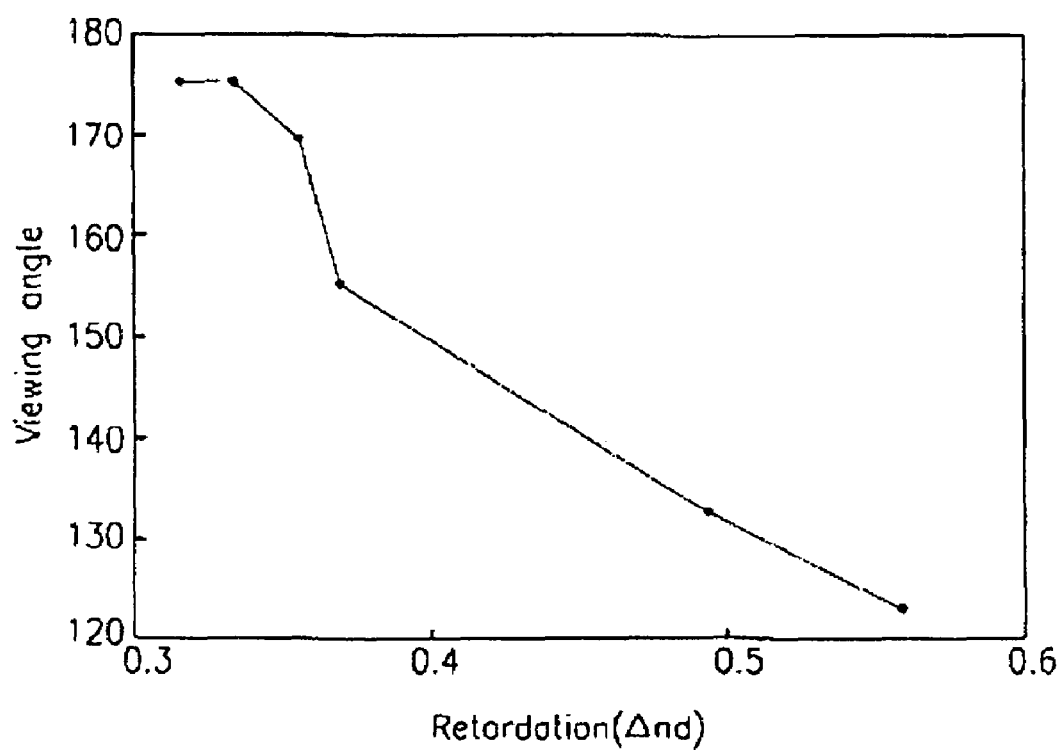
FIG. 9 is a graph of the viewing angle in the 45° diagonal direction as a function of the retardation value.

FIG. 9 is a graph of the viewing angle in the 45° diagonal direction as a function of the retardation value.

As shown in FIG. 9, the retardation value Δnd is preferably equal to or less than 0.4 to get a wide viewing angle over 140°.

Experiment 5

In this experiment, the dependency of the response time on the cell gap and d/p was measured. Two test cells were used having the cell gap of 4.0 μm and 4.5 μm respectively, and d/p varied in the range of 0.1-0.5 by adjusting the amount of the added dopant. Other conditions were the same as in Experiment 4.

Figure 10:
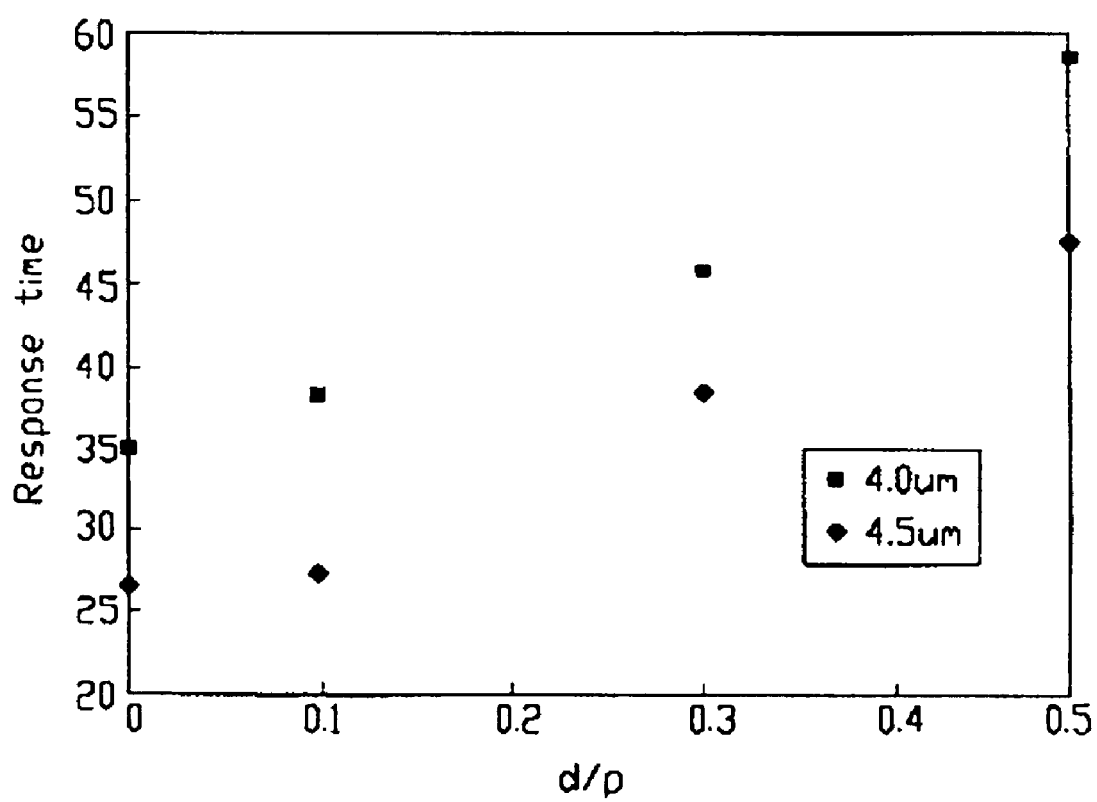
FIG. 10 illustrates the relation between the cell gap and the response time.

FIG. 10 is a graph of the response time as a function of the cell gap and d/p.

As shown in FIG. 10, the response time is shorter as the cell gap and d/p is smaller. If the cell gap is narrow, the electric field is stronger than when the cell gap is small, and, therefore, the liquid crystal molecules respond faster. The response time increases as d/p increases because the viscosity of the liquid crystal material increases as the density of dopant increases.

Now, film-compensated VATN liquid crystal displays according to the embodiments of the present invention will be described in detail. FIGS. 11A-20 show the structures of VATN liquid crystal displays according to the embodiments.

Figure 11A:
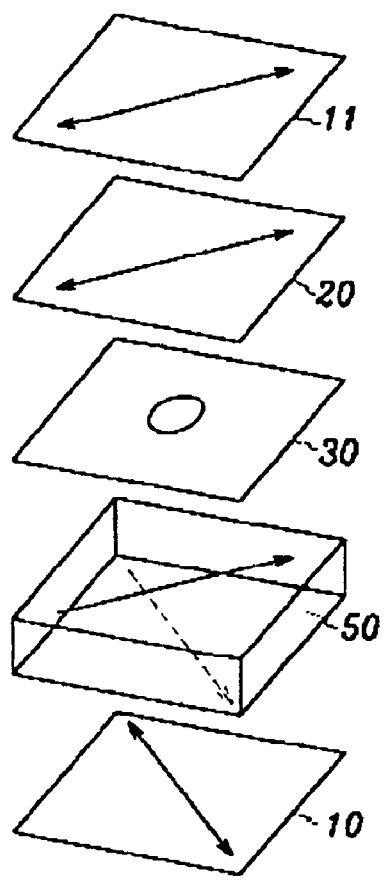
FIGS. 11A-20 show the structures of the liquid crystal display according to the first to the sixteenth embodiments respectively.

A VATN liquid crystal display according to the first embodiment of the present invention is shown in FIG. 11A.

A liquid crystal cell 50 having a liquid crystal material with negative dielectric anisotropy such as that as shown in FIG. 1A is prepared. A polarizer 10 is attached on the outer surface of rear side of the liquid crystal cell 50. On the outer surface of the front side of the liquid crystal cell 50 an a-plate compensation film 20, a c-plate compensation film 30 and another polarizer 11 are attached in sequence. The buffing direction of an alignment layer (such as 14 in FIG. 1A) on the inner surface of the front side of the liquid crystal cell 50 up-right. The solid arrow indicates the buffing direction of the alignment layer the front side of the liquid crystal cell. On the contrary, the buffing direction of an alignment layer (such as 15 in FIG. 1A) on the inner surface of the rear side of the liquid crystal cell 50 is down-right. The dotted arrow indicates the buffing direction of the alignment layer on the rear side of the liquid crystal cell. In the first embodiment of the present invention, the liquid crystal cell operates in "e" mode that the polarizing directions of the polarizers 10 and 11 represented by bidirectional arrows are parallel to the buffing directions of the neighboring alignment layers.

An a-plate compensation film has the refractive indices $n_x$, $n_y$ and $n_z$ satisfying the relation $n_x > n_y = n_z$, and a c-plate compensation has the refractive indices satisfying the relation $n_x = n_y > n_z$, and where $n_x$, $n_y$ and $n_z$ are respectively the refractive indices in the x-direction, y-direction and z-direction when the z-direction is perpendicular to the surface of the liquid crystal cell 50, and the x-axis and y-axis spans a plane parallel to the surface of the liquid crystal cell 50.

The x-axis of the a-plate compensation film, which has a largest refractive index (slow axis), may match with or be perpendicular to the polarizing direction of its neighboring polarizer. If not, the light leakage may be generated to reduce the contrast ratio. In the case that the liquid crystal display shown in FIG. 11A, the x-axis of the a-plate compensation film 20 is in the up-right direction and parallel to the polarizing direction of the polarizer 11. The solid bidirectional arrow drawn on the a-plate compensation film 20 indicates the direction of the x-axis of the a-plate compensation film 20.

Figure 11B:
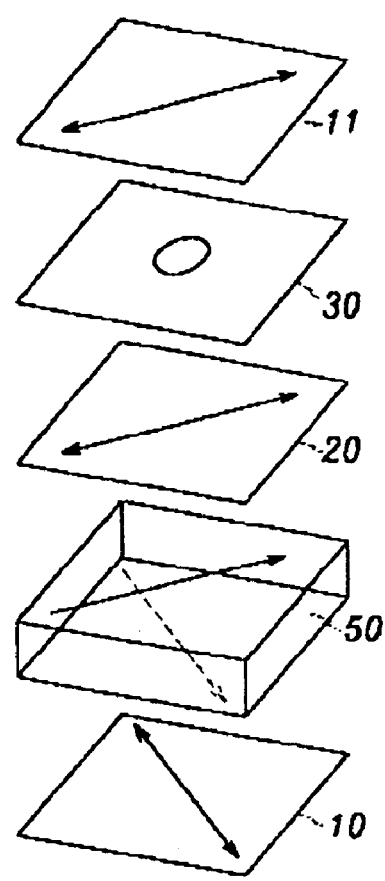
Figure 12A:
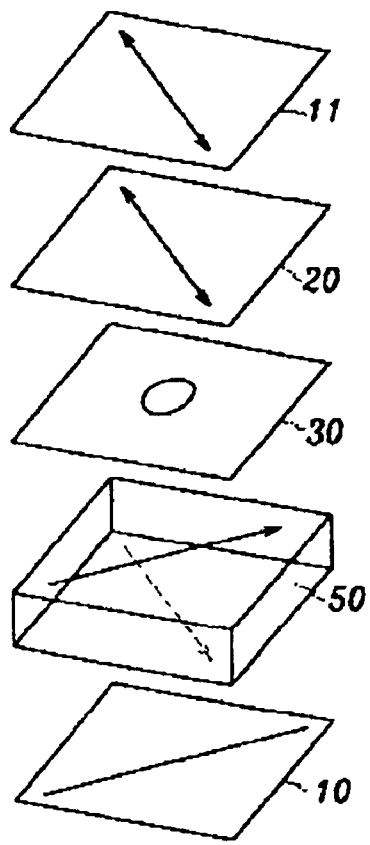
Figure 12B:
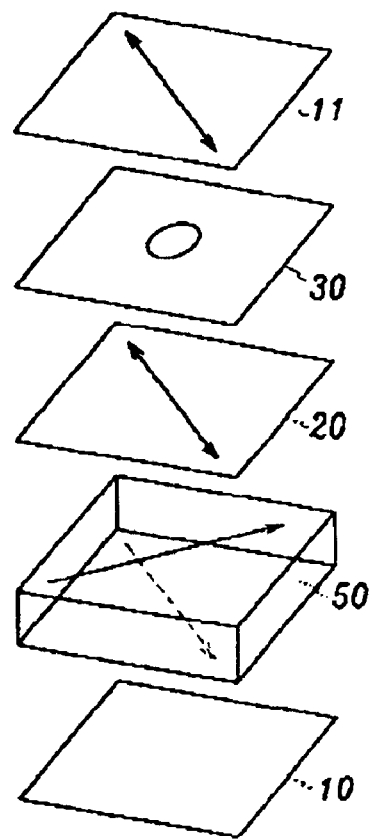
Figure 12C:
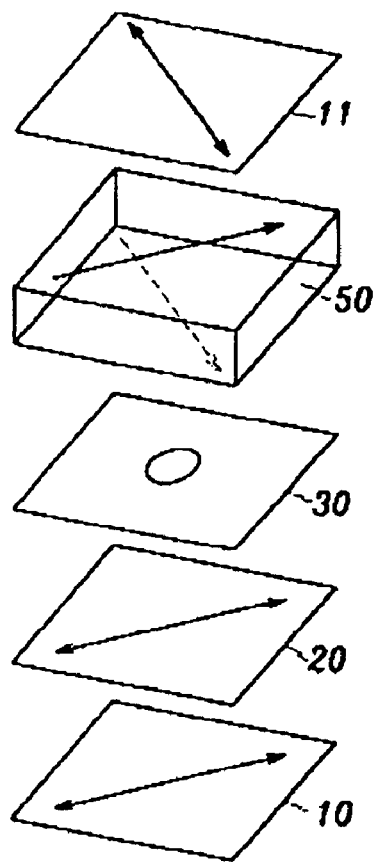
Figure 12D:
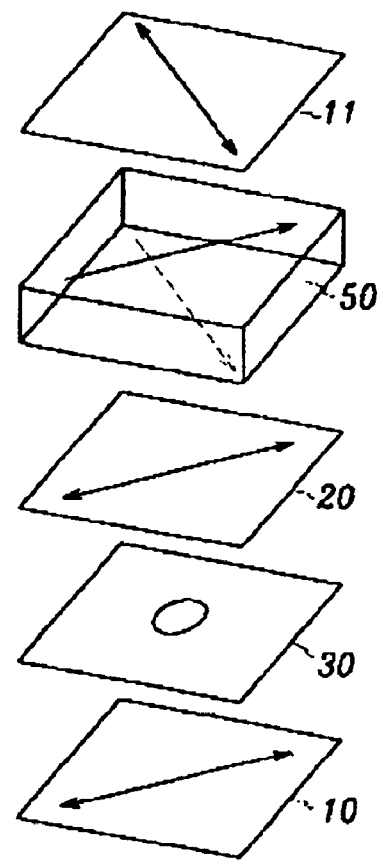

According to the second embodiment, as shown in FIG. 11B, the positions of a-plate and c-plate compensation films are exchanged. On the rear side of the liquid crystal cell 50, a polarizer 10 is attached. An a-plate compensation film 20, a c-plate compensation film 30 and a polarizer 11 is attached on the front side of the liquid crystal cell 50 in sequence. The buffering directions of the alignment layer, the polarizing directions of the polarizer 10 and 11 and the x-axis of the a-plate compensation film 20 are similar to those of the first embodiment.

Liquid crystal displays according to the third and the fourth embodiments are shown in FIGS. 11C and 11D respectively, where the compensation films 20 and 30 are inserted between the rear polarizer 10 and the liquid crystal cell 50. According to the third embodiment, a c-plate compensation film 30, an a-plate compensation film 20 and a polarizer 10 are attached in sequence on the rear side of the liquid crystal cell 50 (FIG. 11C). In the fourth embodiment, the positions of the c-plate compensation film 30 and the a-plate compensation film 20 are opposite to those in the third embodiment (FIG. 11D). The buffing directions of the alignment layers and the polarizing directions of the polarizers 10 and 11 are similar to those of the first embodiment. The x-axis of the a-plate compensation film 20 is matched with the polarizing direction of the rear polarizer 10 neighboring to the a-plate compensation film 20.

FIGS. 12A-12D illustrate liquid crystal displays according to the fifth to the eighth embodiment, and the liquid crystal displays operate in "o" mode. Arrangements of a liquid crystal cell 50, polarizers 10 and 11, an a-plate compensation film 20 and a c-plate compensation film 30 are substantially the same as those of the liquid crystal displays shown in FIGS. 11A-11D. The difference is that the liquid crystal displays operate in "o" mode, that is, the buffing directions of alignment layers are perpendicular to the polarizing directions of the neighboring polarizes, and that the buffing directions of the alignment layers are perpendicular to x-axis of the a-plate compensation films.

Figure 13:
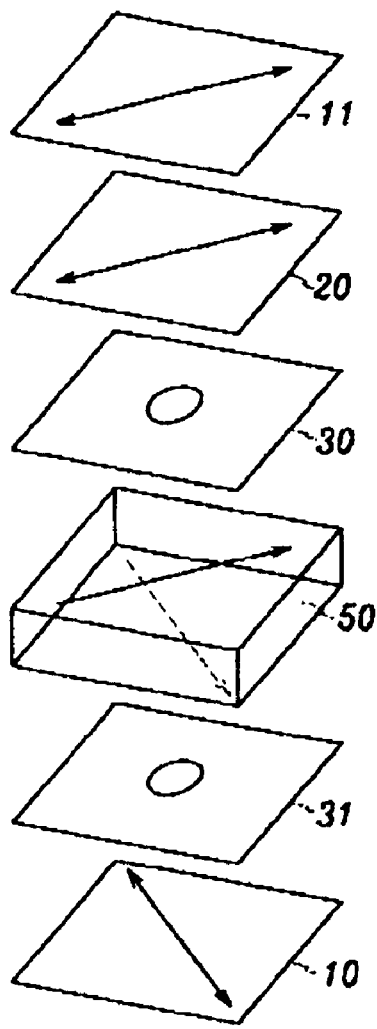
Figure 14:
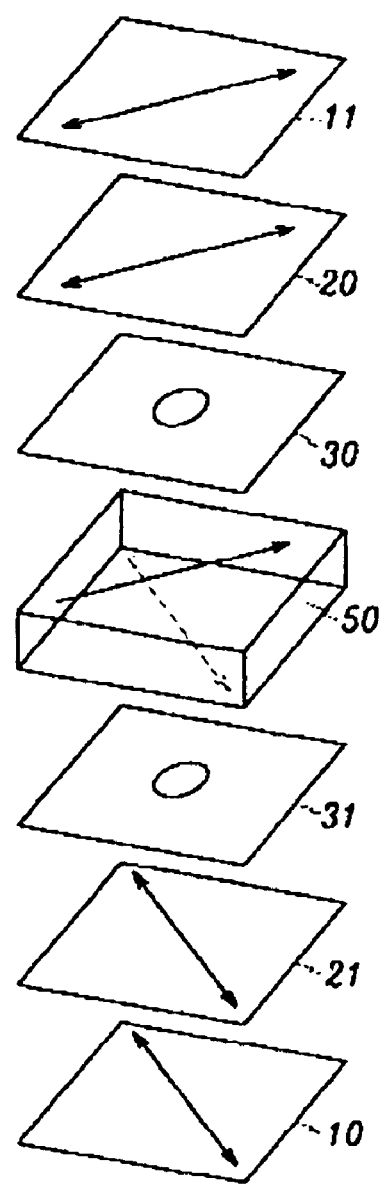

FIG. 13 illustrates a liquid crystal display according to the ninth embodiment. The liquid crystal display has another c-plate compensation film 31 inserted between the liquid crystal cell 50 and the rear polarizer 10 in the first embodiment. The liquid crystal display according to the tenth embodiment, as shown in FIG. 14, has another a-plate compensation film 21 inserted between the c-plate compensation film 31 and the rear polarizer 10 in the ninth embodiment, and the x-asis of the a-plate film 21 is parallel to the polarizing direction of the rear polarizer 10.

Figure 15:
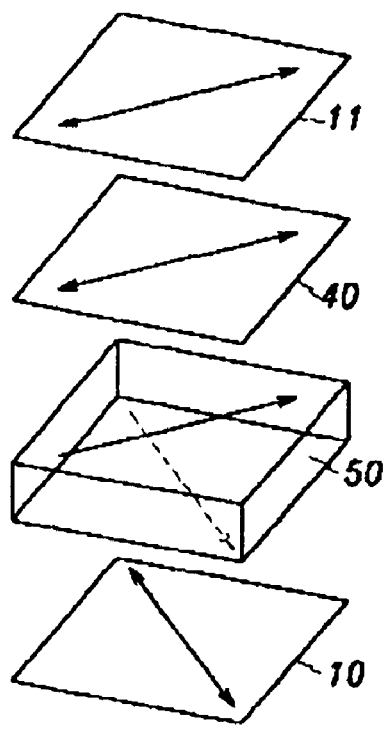

A liquid crystal display according to the eleventh embodiment is shown in FIG. 15. A rear polarizer 10 is attached to the rear side of a liquid crystal cell 50 having a liquid crystal material with negative dielectric anisotropy. On the opposite side of the liquid crystal cell, a biaxial compensation film 40 is interposed between the liquid crystal cell 50 and a front polarizer 11. The biaxial compensation film has the refractive indices satisfying the relation that $n_x > n_y > n_z$. As in the embodiments described above, the x-axis of the biaxial compensation film may be parallel or perpendicular to the polarizing direction of its neighboring polarizer. It may operate in "e" mode or "o" mode.

Figure 16:
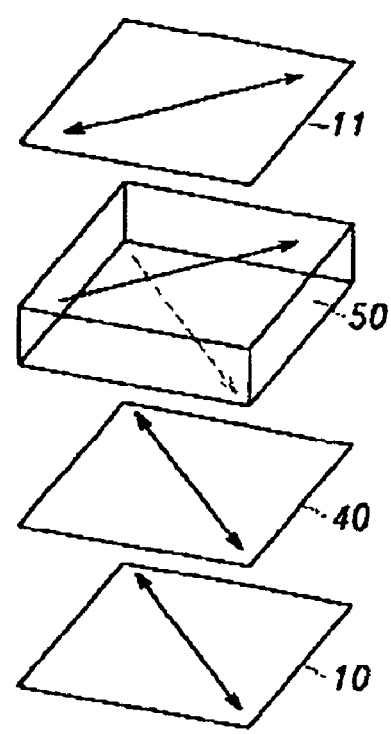

According to the twelfth embodiment, a biaxial compensation film 40 is interposed between a rear polarizer 10 and the rear side of a liquid crystal cell 50, and a front polarizer 11 is attached directly on the front side of the liquid crystal cell 50, as shown in FIG. 16. As in the embodiments described above, the x-axis of the biaxial compensation film may be parallel or perpendicular to the polarizing direction of its neighboring polarizer. It may operate in "e" mode or "o" mode.

Figure 17:
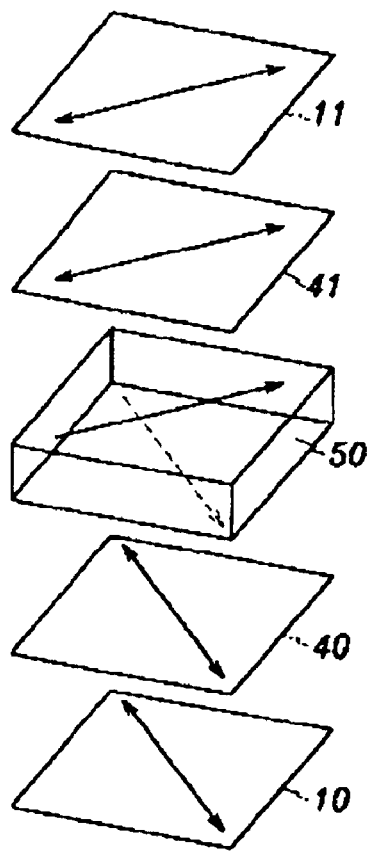

As shown in FIG. 17, according to the thirteenth embodiment, two biaxial compensation films 40 and 41 are, inserted between respective polarizers 10 and 11 and the front and rear side of a liquid crystal cell 50, respectively. As in the embodiments described above, the x-axis of the biaxial compensation film may be parallel or perpendicular to the polarizing direction of its neighboring polarizer. It may operate in "e" mode or "o" mode.

Figure 18:
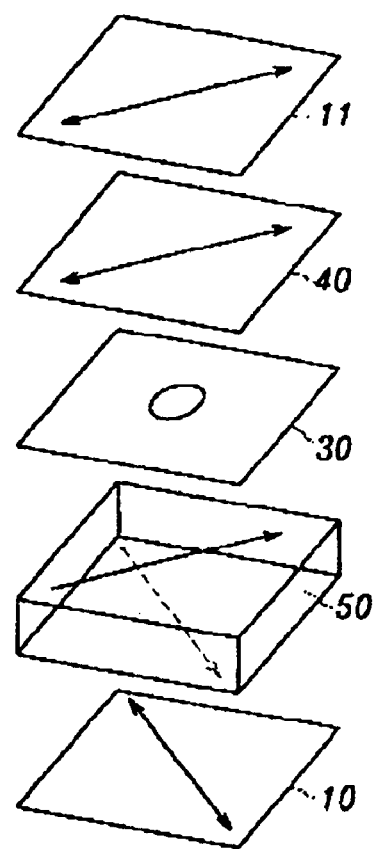

A liquid crystal display according to the fourteenth embodiment is shown in FIG. 18. A rear polarizer 10 is attached to the rear side of a liquid crystal cell 50 having a liquid crystal material with negative dielectric anisotropy. On the opposite side of the liquid crystal cell, a biaxial compensation film 40 and a c-plate compensation film 30 are inserted between the liquid crystal cell 50 and a front polarizer 11. The x-axis of the biaxial compensation film 40 is parallel to the polarizing direction of its neighboring polarizer 11. The liquid crystal cell operates in "e" mode that the polarizing directions are parallel to the buffing directions of the neighboring alignment layers in this embodiment. The position of the biaxial compensation film 40 and the c-plate compensation film 30 may be exchanged, and they may be inserted between a rear polarizer 10 and the liquid crystal cell 50.

Figure 19:
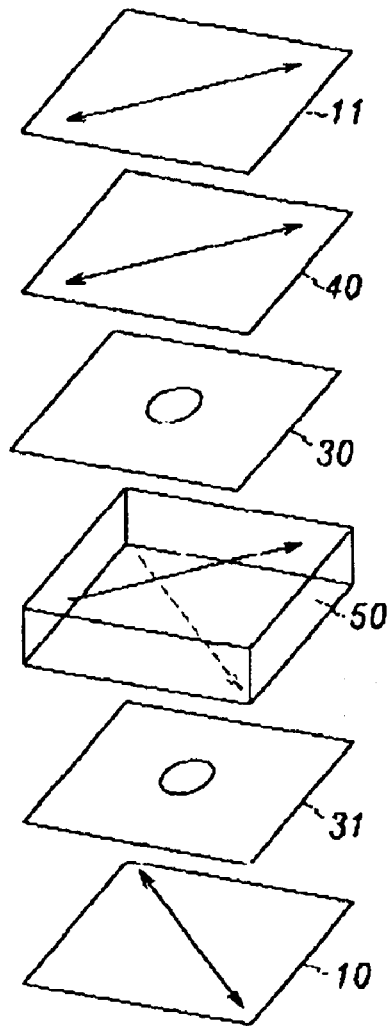
Figure 20:
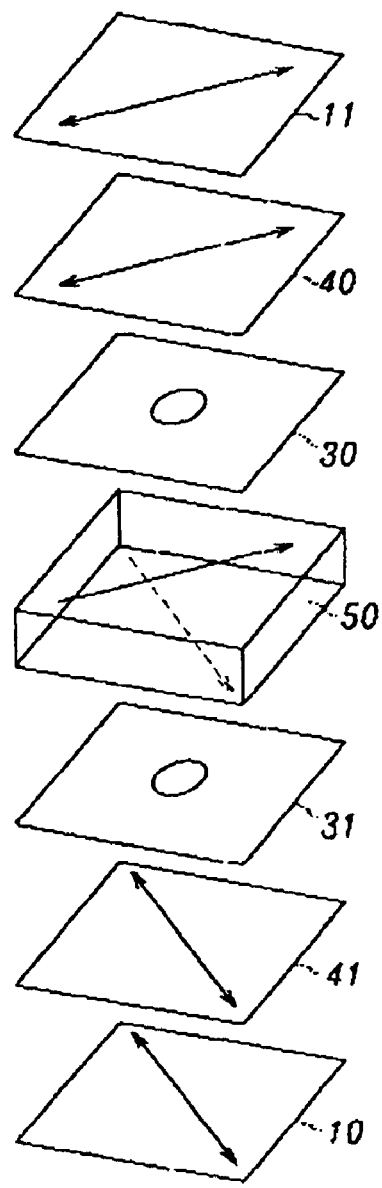

Another c-plate compensation film 31 may be added between the rear polarizer 10 and the liquid crystal cell of the fourteenth embodiment, according the fifteenth embodiment as shown in FIG. 19. A c-plate compensation film and a biaxial compensation film may be added to the LCD of fourteenth embodiment as in the sixteenth embodiment (FIG. 20). The x-axis of the biaxial compensation film may be perpendicular to the polarizing direction of the neighboring polarizer, and the liquid crystal display may operate in "o" mode.

In the meantime, the contrast ratio CR for the VATN LCD is defined as follows:

$$CR = (luminance)_{ON}/(luminance)_{OFF}.$$

That is, the contrast ratio in normally black mode is the value that (luminance)$_{ON}$, which is the luminance at the state that the voltage is applied (on state), divided by (luminance)$_{OFF}$, which is the luminance at the state that the voltage is not applied (off state). The contrast ratio may be drastically improved if somehow the luminance in off state is further reduced.

The viewing angle characteristics and gray scale performance of the film compensated VATN LCD according to the present invention were calculated by optical simulation program. The geometrical structure and relevant parameters used in the simulation are summarized in Table 1. It was assumed that the polarizer itself gives retardation of −60 nm.

TABLE 1

The parameters of VATN calls for optical simulations

| | | |
|---|---|---|
| Elastic constant (pN) | $K_1$ | 16.6 |
| | $K_2$ | 6.5 |
| | $K_3$ | 18.5 |
| Relative dielectric constant | $\epsilon_\|\|$ | 3.5 |
| | $\epsilon_\perp$ | 7.7 |
| Refractive index | $n_e$ | 1.5584 |
| | $n_o$ | 1.4757 |
| Pretilt angle | $\theta_p$ | 89° |
| Twist angle | $\Phi_{TN}$ | 90° |
| Cell gap (μm) | d | 4.0 |
| Cell gap divided by Pitch | d/p | 0.1 |
| Off state voltage (V) | $V_{off}$ | 0 |
| On state voltage (V) | $V_{on}$ | 5 |
| Buffing direction | front | 45° or 225° |
| | back | 315° or 135° |

The net retardation value due to all retardation films (including the polarizers), $(n_x-n_z)*d$, is preferably equal to that of the liquid crystal cell birefringence. In our case, the liquid crystal cell birefringence was around 320 nm. However, the biaxiality of the compensation films may be optimized in the individual case.

Figure 21:
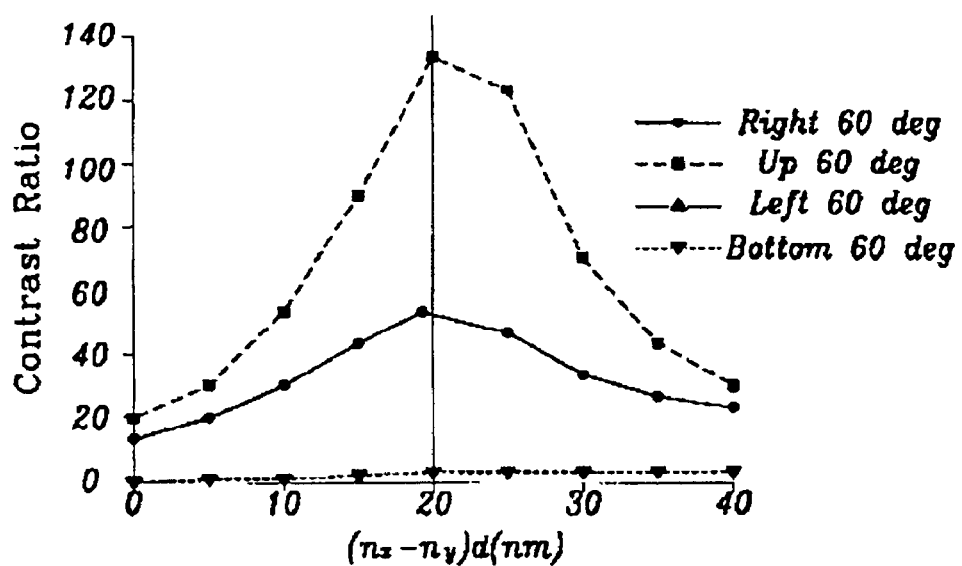
FIG. 21 is a graph showing the contrast ratios in right, up, left and bottom 60° directions as a function of the retardation value $(n_x-n_y)*d$ for the LCD according to the tenth embodiment of the present invention shown in FIG. 14.

FIG. 21 is a graph showing the contrast ratios in right, up, left and bottom 60° directions as a function of the retardation value $(n_x-n_y)*d$ for the LCD according to the tenth embodiment of the present invention shown in FIG. 14.

Referring to FIG. 14, the structure of the VATN LCD according to the tenth embodiment of the present invention is more fully described. A liquid crystal cell 50 has a liquid crystal material with negative dielectric anisotropy. On the front side of the liquid crystal cell 50, a c-plate compensation film 30 and an a-plate compensation film 20 is attached in sequence, and a polarizer 11 is attached thereto. On the rear side of the liquid crystal cell 50, a c-plate compensation film 31 and an a-plate compensation film 11 is attached in sequence, and a polarizer 11 is also attached thereto. The polarizing directions of the polarizers 10 and 11 are parallel to the buffing direction of their neighboring alignment layers of the liquid crystal cell 50. That is, the liquid crystal cell operates in "e" mode. The orientation of x-axis (slow axis) of a-plate compensation film 20 and 21 matches with the polarizing direction of its neighboring polarizer.

The optimum retardation value $(n_{xa}-n_{ya})*d_a$ of the a-plate compensation film is around 20 nm as shown in graph of FIG. 21 where $n_{xa}$ and $n_{ya}$ are respectively the refractive indices along the x-axis and the y-axis of the a-plate compensation films, and $d_a$ is the thickness of the a-plate compensation film. The maximum contrast ratio is 140:1 in up 60° direction.

Figure 22:
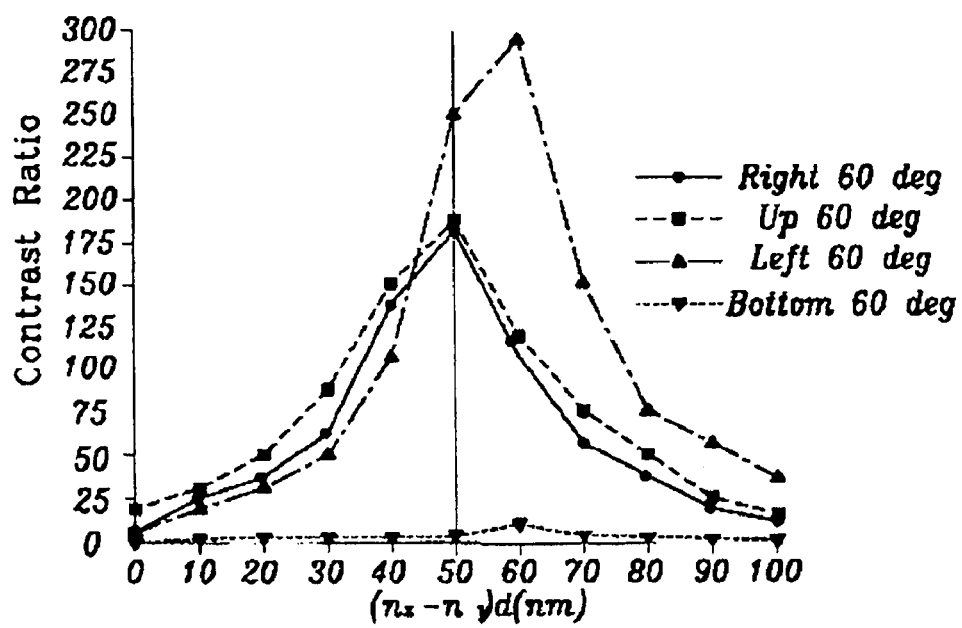
FIG. 22 is a graph showing the contrast ratios in right, up, left and bottom 60° directions as a function of the retardation value $(n_{xb}-n_{yb})*d_b$ or the LCD according to the tenth embodiment of the present invention shown in FIG. 15.

FIG. 22 is a graph showing the contrast ratios in right, up, left and bottom 60° directions as a function of the retardation value $(n_{xb}-n_{yb})*d_b$ for the LCD according to the tenth embodiment of the present invention shown in FIG. 15 where $n_{xb}$ and $n_{yb}$ are respectively she refractive indices along the x-axis and the y-axis of the biaxial compensation films, and $d_b$ is the thickness of the biaxial compensation film. The optimum retardation value $(n_{xb}-n_{yb})*d_b$ of the biaxial compensation film is around 50 nm as shown in FIG. 22.

If a biaxial compensation film is used as in the eleventh embodiment of the present invention, the contrast ratio may be more improved. As shown in FIG. 22, the contrast ratio is over 175:1 in up 60° direction. The contrast ratio in left and right 60° directions are about 250:1 and 175:1, respectively.

Figure 23:
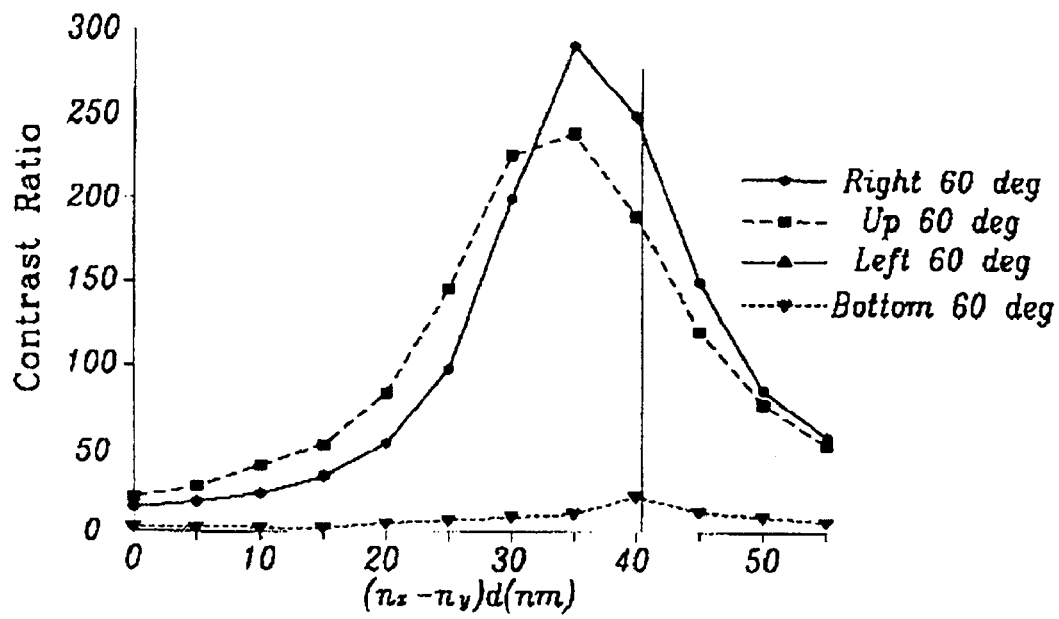
FIG. 23 is a graph showing the contrast ratios in right, up, left and bottom 60° directions as a function of the retardation value $(n_{xb}-n_{yb})*d_b$ for the LCD according to the thirteenth embodiment of the present invention shown in FIG. 17.

FIG. 23 is a graph showing the contrast ratios in right, up, left and bottom 60° directions as a function of the retardation value $(n_{xb}-n_{yb})*d_b$ for the LCD according to the thirteenth embodiment of the present invention shown in FIG. 17.

Referring to FIG. 17, the structure of the VATN LCD according to the thirteenth embodiment of the present invention is described in detail. A liquid crystal cell 50 has a liquid crystal material with negative dielectric anisotropy. Both on the front and rear side of the liquid crystal cell 50, two biaxial compensation films 40 and 41 and two polarizers 11 and 10 are attached respectively. The liquid crystal cell operates in "e" mode that the polarizing directions of the polarizers 10 and 11 are parallel to the buffing directions of their neighboring alignment layers of the liquid crystal cell 50. The orientation of x-axis (slow axis) of biaxial compensation film 40 and 41 matches with the polarizing direction of its neighboring polarizer.

The optimum retardation value $(n_{xb}-n_{yb})*d_b$ of the biaxial compensation film is around 40 nm as shown in FIG. 23. The contrast ratio is as good as in the eleventh embodiment of the present invention.

The contrast ratio in up 60° direction is about 200:1, and the contrast ratios in left and right 60° directions are over 250:1.

In the tenth embodiment of the present invention, if the retardation value $(n_{xc}-n_{zc})*d_c$ of the c-plate compensation films 30 and 31 is 100 nm, the net retardation value of all retardation films (including the polarizers) $(n_x-n_z)*d$, is 360 nm because the retardation value of the a-plate compensation film is 20 nm and the retardation value of the polarizer is 60 nm. This value is nearly equal to the liquid crystal cell birefringence.

In the eleventh embodiment of the present invention, if the retardation value $(n_{xb}-n_{zb})*d_b$ of the biaxial compensation films 40 is 200 nm, the total retardation value of all retardation films, $(n_x-n_z)*d$, is 320 nm. This value is equal to the liquid crystal cell birefringence.

In the thirteenth embodiment of the present invention, if the retardation value $(n_{xb}-n_{zb})*d_b$ of the biaxial compensation films 40 and 41 is 100 nm, the net retardation value of air retardation, $(n_x-n_z)*d$, is 320 nm as in the eleventh embodiment of the present invention.

As shown in the above, if the difference between the net retardation value of all retardation, $(n_x-n_z)*d$, and the liquid crystal cell birefringence is relatively small, the viewing characteristics are much improved. The difference is preferably equal to or less than 15% of the liquid crystal cell birefringence.

Figure 24:
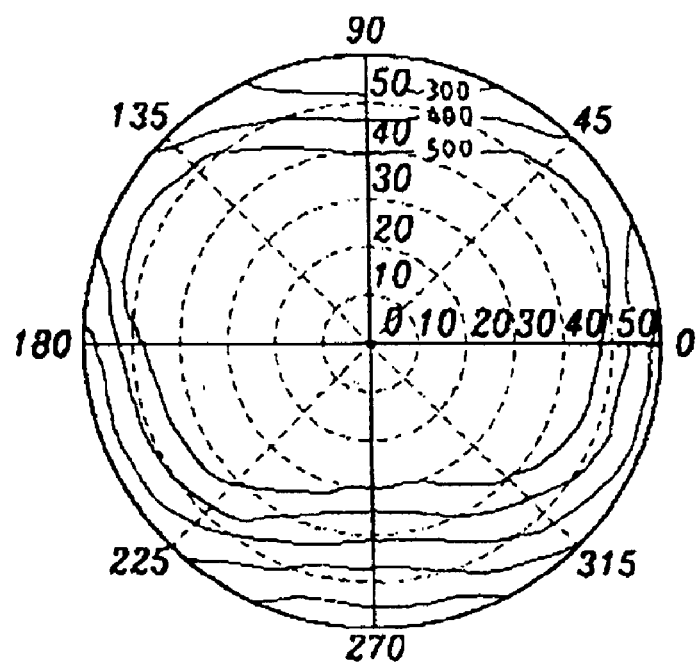
FIG. 24 shows the viewing angle characteristics of the VATN LCD according to the eleventh embodiment.
Figure 25:
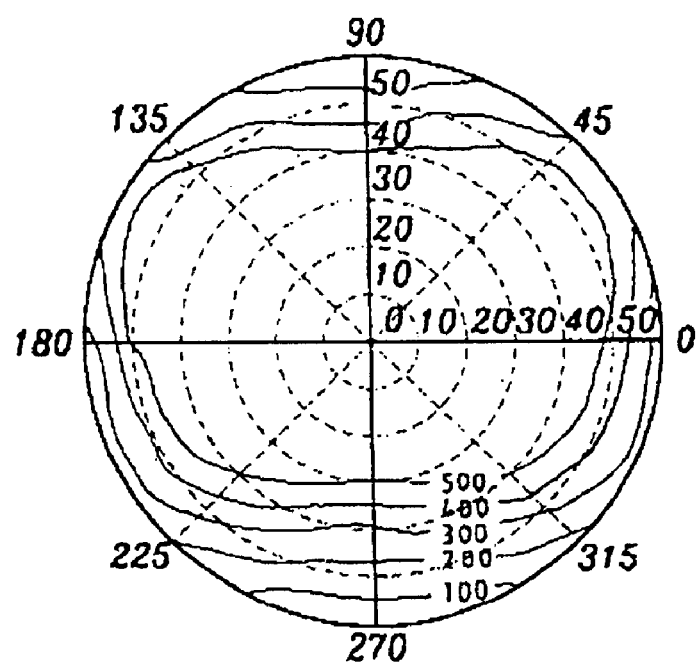
FIG. 25 shows the viewing angle characteristics of the VATN LCD according to the thirteenth embodiment.

FIGS. 24 and 25 show the viewing angle characteristics or the film compensated VATN LCDs according to the eleventh and thirteenth embodiments of the present invention, respectively. The viewing angle characteristics are dramatically improved compared with the cases that the compensation film is not used and that c-plate compensation films are used.

Figure 26:
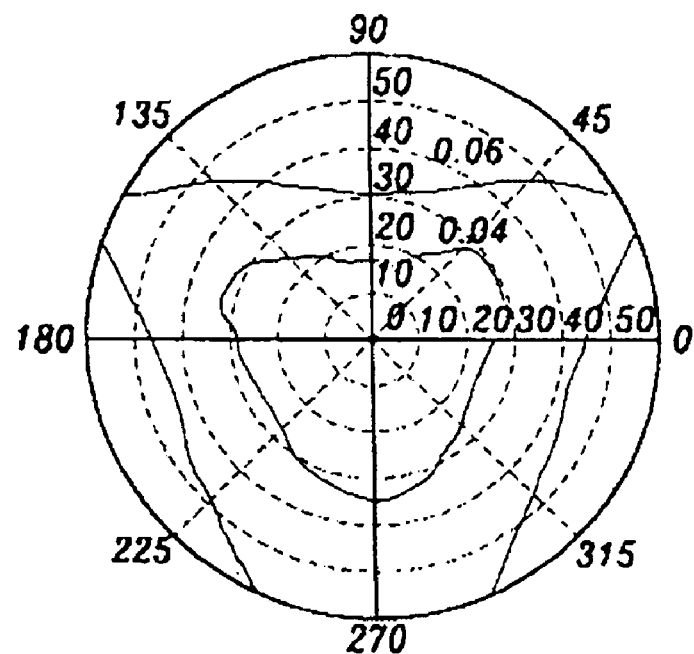
FIG. 26 shows the 3-D luminance of the VATN LCD according to the eleventh embodiment.
Figure 27:
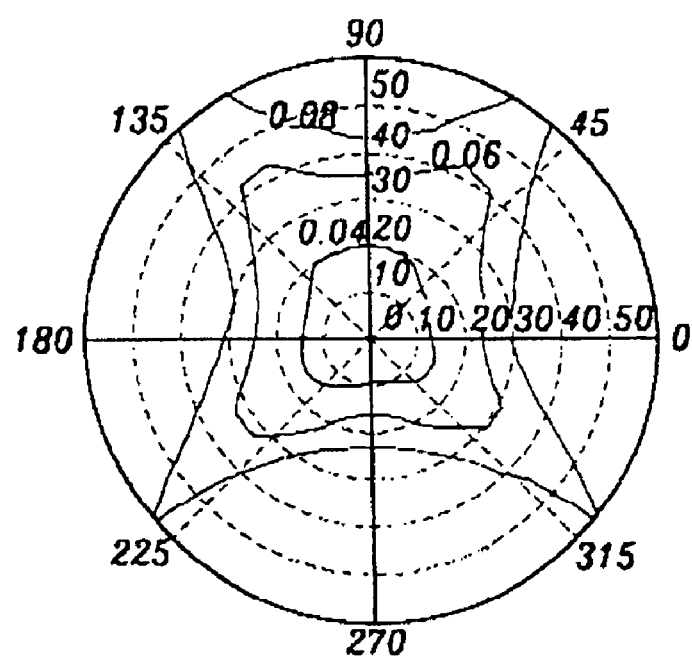
FIG. 27 shows the 3-D luminance of the VATN LCD according to the thirteenth embodiment.

FIGS. 26 and 27 show the 3-dimensional luminance distributions of the film compensated VATN LCDs according to the eleventh and thirteenth embodiments of the present invention, respectively. A VATN LCD in off state has the intrinsic light leakage in 45° direction relative to the polarizing direction. The c-plate compensation film with optimum value may reduce the light leakage by 10 times. The optimum black states of the VATN LCDs may be achieved by using the biaxial compensation films according to embodiments of the present invention. It results in the extremely high contrast ratio.

Figure 28A:
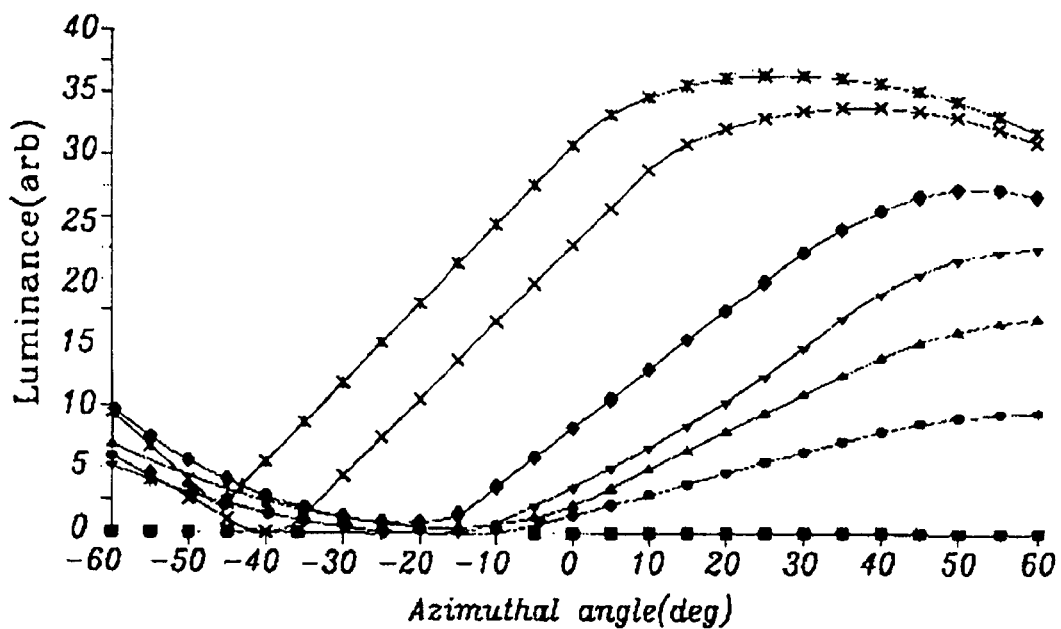
FIG. 28A-28C show the 8 gray scale performance of the VATN LCD according to the thirteenth embodiment.
Figure 28B:
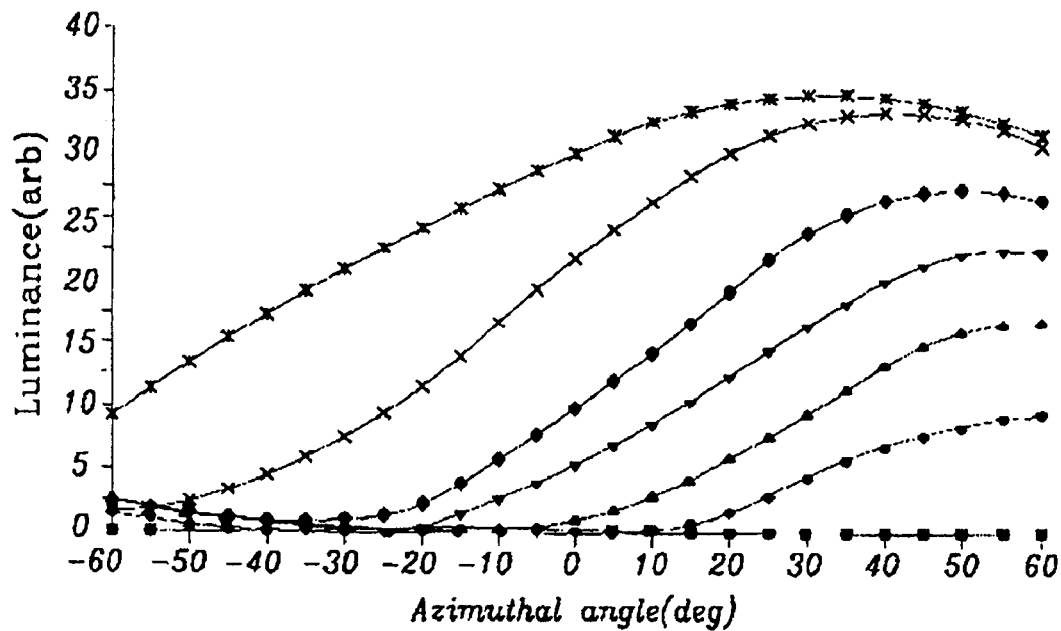
Figure 28C:
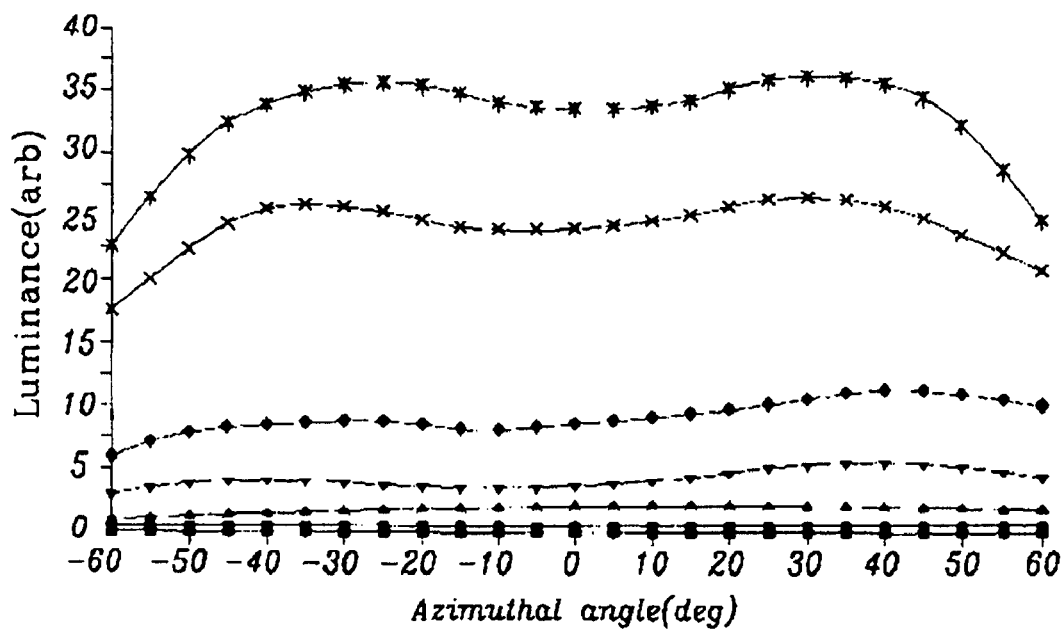

The eight gray scale performance of the VATN LCD according to the thirteenth embodiment using the optimum biaxial compensation film is calculated, and the calculated result is shown in FIGS. 28A-28C. FIG. 28A is the graph of the luminance as a function of the azimuthal angle in the plane making 45° relative to the polarizing directions. FIG. 28B is the graph of the luminance as a function of the azimuthal angle in the vertical plane to the polarizing direction, and FIG. 28C is the graph of the luminance as a function of the azimuthal angle in the horizontal plane to the polarizing direction. Although the contrast of the display gets improved a lot in theses compensation modes, the gray scale performances are not so good enough.

Figure 29A:
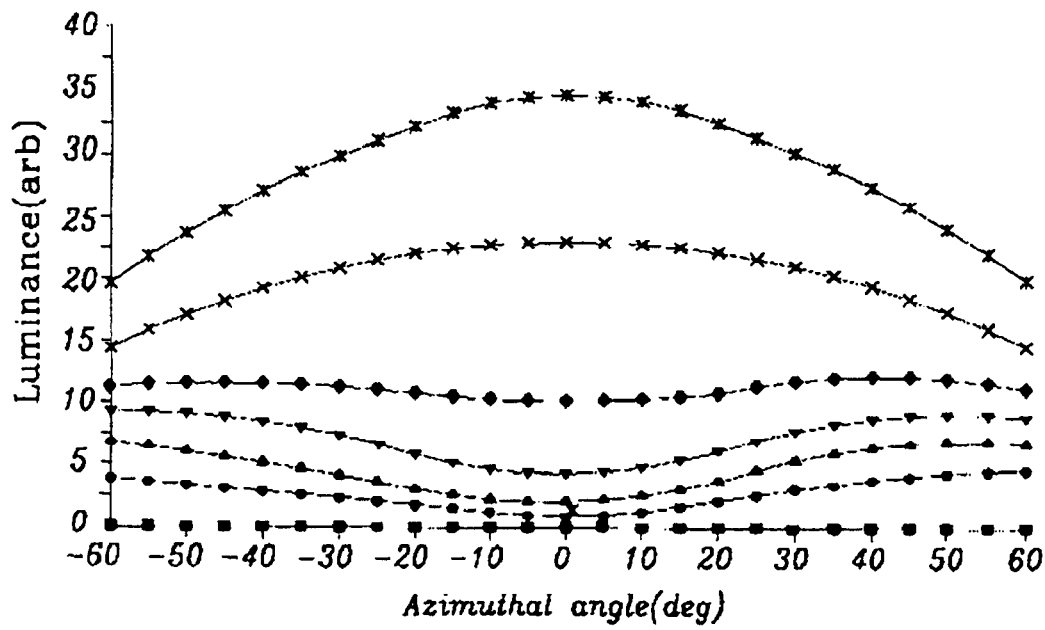
FIG. 29A-29D show the 8 gray scale performance of the 2-D VATN LCD having the structure of the thirteenth embodiment
Figure 29B:
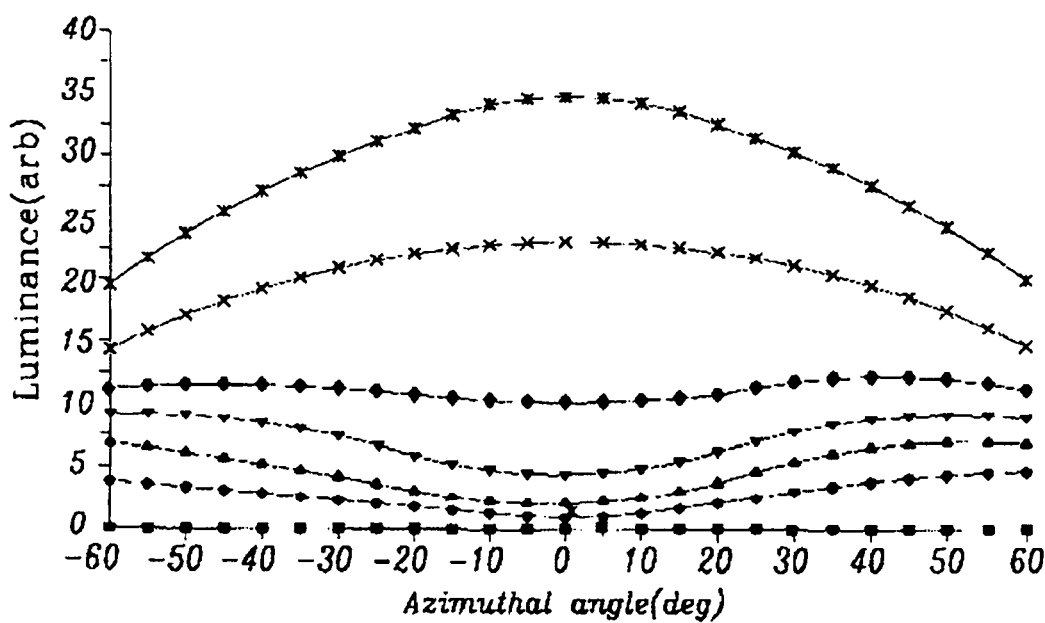
Figure 29C:
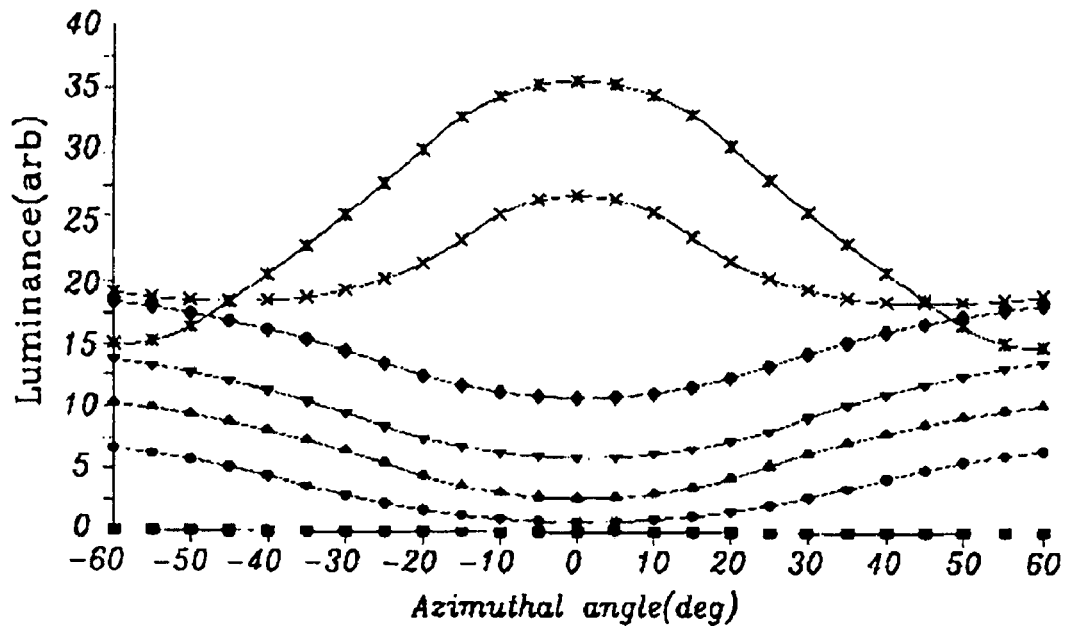
Figure 29D:
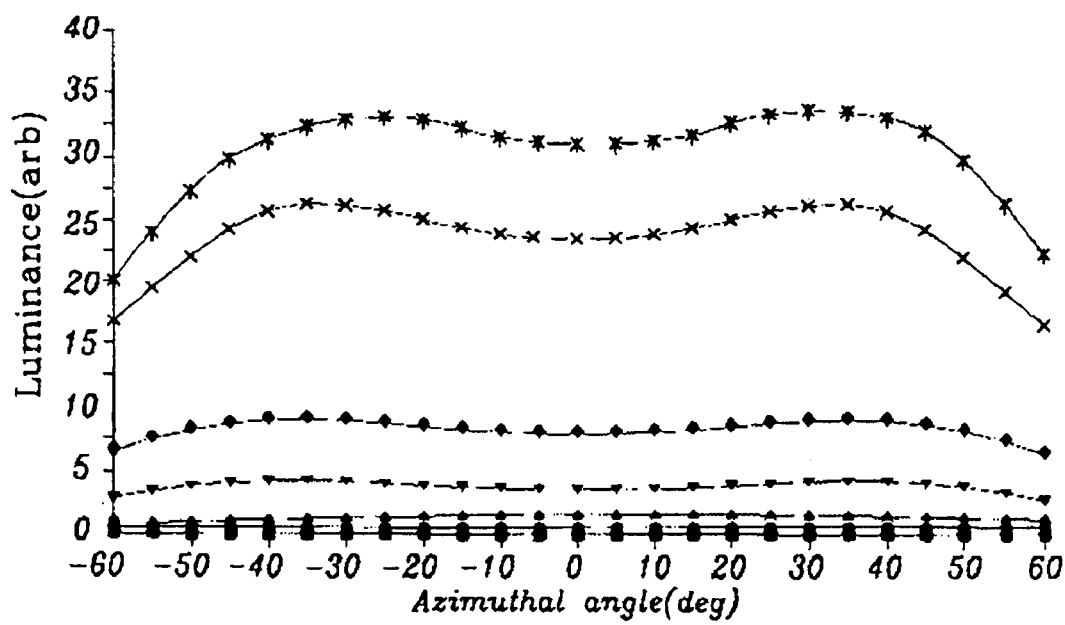

If the compensation configurations according to the embodiments of the present invention are adapted to 2-domain VATS LCD, the gray scale performance gets greatly improved. FIGS. 29A-29D show the gray scale performance of 2-D VATN LCD having the compensation configuration according to the thirteenth embodiment of the present invention. FIG. 29A is the graph of the luminance as a function of the azimuthal angle in the horizontal plane to the polarizing direction. FIG. 29B is the graph of the luminance as a function of the azimuthal angle in the vertical plane to the polarizing direction, and FIGS. 29C and 29D are respectively the graph of the luminance as a function of the azimuthal angle in the planes making 45° and 135° relative to the polarizing direction.

Figure 30:
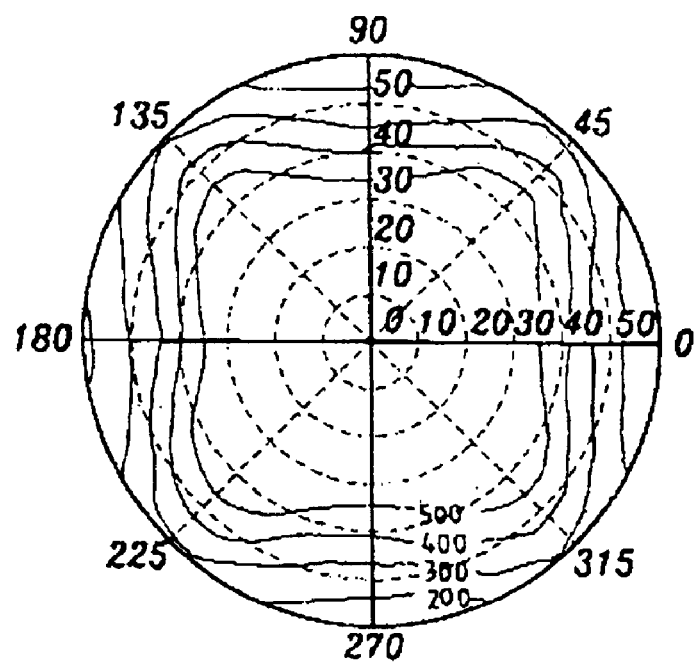
FIG. 30 shows the viewing angle characteristics of the 2-D VATN LCD having the structure of the tenth embodiment.
Figure 31:
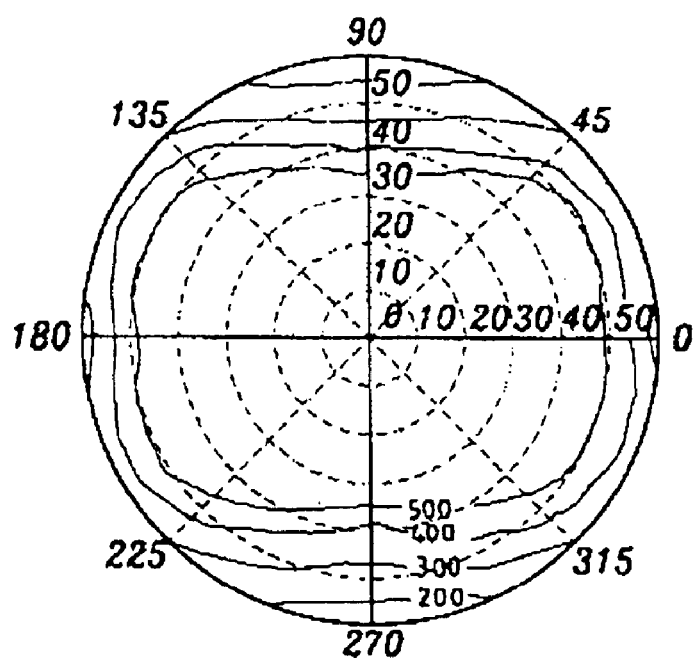
FIG. 31 shows the viewing angle characteristics of the VATN LCD having the structure of the eleventh embodiment.

FIGS. 30 and 31 show the gray scale performances of 2-D VATN LCDs having the compensation configurations according to the tenth and the eleventh embodiments of the present invention, respectively.

All compensation configurations shown in FIGS. 11A-20 can be used for 2-D or multi-domain VATN LCDs as long as the buffing directions match with the x-axis (slow axis) of the biaxial or the a-plate compensation film.

Moreover, the film compensated VATN LCDs according to the present invention may be adapted to ECB (electrically controlled birefringence) VATN LCDs, fringe controlled multi-domain VATN LCDs. IPS (in-plane switching) mode VATN LCDs, etc.

In the drawings and specification, there have been disclosed typical preferred embodiments of the invention and, although specific terms are employed, they are used in a generic and descriptive sense only and not for purposes of limitation, the scope of the invention being set forth in the following claims.

What is claimed is:
1. A liquid crystal display comprising:
a vertically aligned liquid crystal cell having first and second surfaces opposite each other and having a liquid crystal material with negative dielectric anisotropy interposed therebetween;
first and second polarizers attached to the first and the second surfaces of the liquid crystal cell, respectively; and
a first biaxial compensation film having different refractive indexes in three directions disposed between the first surface of the liquid crystal cell and the first polarizer;
wherein a direction having a largest refractive index in the first biaxial compensation film is parallel or perpendicular to the polarizing direction axis of the first polarizer, and
wherein the difference between the summation of the retardation value of the first biaxial compensation film, $(n_{xb1}-n_{zb1})*d_{b1}$ and the first and the second polarizers, and the retardation value due to birefringence of the liquid crystal cell is equal to or less than 15% of the retardation value due to birefringence of the liquid crystal cell,
where a z-axis is perpendicular to the first plane of the liquid crystal cell, an x-axis is the same direction as the direction having the largest refractive index in the first biaxial compensation film, $n_{xb1}$ and $n_{zb1}$ are respectively the refractive indices along the x-axis and the z-axis of the first biaxial compensation film, and $d_{b1}$ is the thickness of the first biaxial compensation film.

2. The liquid crystal display of claim 1, wherein the retardation value $(n_{xb1}-n_{yb1})*d_{b1}$ of the first biaxial compensation film is in the range of 0-100 nm,
where a y-axis is in the first plane of the liquid crystal cell and perpendicular to the x-axis, $n_{yb1}$ is the refractive index of the first biaxial compensation film along the y-axis.

3. The liquid crystal display of claim 2, wherein the liquid crystal cell comprises:
a pair of transparent substrates;
homeotropic alignment layers which are formed on the substrates and divided into two regions whose buffing directions are different; and
a liquid crystal material with negative dielectric anisotropy interposed between the alignment layers.

4. The liquid crystal display of claim 3, wherein the buffing direction of the alignment layer adjacent to the first biaxial compensation film matches with the direction having the largest refractive index of the first biaxial compensation film.

5. The liquid crystal display of claim 1, further comprising a second biaxial compensation film attached to the second surface of the liquid crystal cell.

6. The liquid crystal display of claim 5, wherein the direction having a largest refractive index in the second biaxial compensation film is parallel or perpendicular to the polarizing direction of the second polarizer.

7. The liquid crystal display of claim 6, wherein the difference between the summation of the retardation value of the first biaxial compensation film, $(n_{xb1}-n_{zb1})*d_{b1}$ the retardation value of the second biaxial compensation film, $(n_{xb2}-n_{zb2})*d_{bZ}$ and the first and the second polarizers, and the retardation value due to birefringence of the liquid crystal cell is equal to or less than 15% of the retardation value due to birefringence of the liquid crystal cell,
where a z-axis is perpendicular to the first plane of the liquid crystal cell, an x-axis is the direction having a largest refractive index in the first biaxial or the second biaxial compensation film, $n_{xb1}$, $n_{zb1}$, $n_{xb2}$ and $n_{zb2}$ are respectively the refractive indices along the x-axis and the z-axis of the first and the second biaxial compensation films, and $d_{b1}$ and $d_{b2}$ are the thicknesses of the first and the second biaxial compensation films, respectively.

8. The liquid crystal display of claim 7, wherein the summation of the retardation value $(n_{xb1}-n_{yb1})*d_{b1}$ of the first biaxial compensation film and the retardation value $(n_{xb2}-n_{yb2})*d_{b2}$ of the second biaxial compensation film is in the range of 0-100 nm,
where a y-axis is in the first plane of the liquid crystal cell and perpendicular to the x-axis, $n_{yb1}$ and $n_{yb2}$ are the refractive indices of the first and the second biaxial compensation films along the y-axis.

9. The liquid crystal display of claim 8, wherein, the liquid crystal cell comprises:

a pair of transparent substrates;

homeotropic alignment layers formed on the substrates and divided into two regions whose buffing directions are different; and a liquid crystal material with negative dielectric anisotropy interposed between the alignment layers.

10. The liquid crystal display of claim 9, wherein the buffing directions of the alignment layers adjacent to the first and the second biaxial compensation films match with the directions having the largest refractive index of the first and the second biaxial compensation films.

* * * * *